(12) United States Patent
Hwang et al.

(10) Patent No.: US 11,924,537 B2
(45) Date of Patent: Mar. 5, 2024

(54) IMAGE SIGNAL PROCESSOR AND IMAGE PROCESSING SYSTEM PERFORMING INTERRUPT CONTROL

(71) Applicant: Samsung Electronics Co., Ltd., Suwon-si (KR)

(72) Inventors: Jinwoo Hwang, Seongnam-si (KR); Homin Kang, Suwon-si (KR); Jaeuk Ahn, Suwon-si (KR); Serhoon Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 198 days.

(21) Appl. No.: 17/669,731

(22) Filed: Feb. 11, 2022

(65) Prior Publication Data

US 2022/0408001 A1    Dec. 22, 2022

(30) Foreign Application Priority Data

Jun. 17, 2021 (KR) .......................... 10-2021-0078615

(51) Int. Cl.
*H04N 23/60* (2023.01)
*G06F 9/48* (2006.01)

(52) U.S. Cl.
CPC ........... *H04N 23/60* (2023.01); *G06F 9/4812* (2013.01); *G06F 9/4881* (2013.01)

(58) Field of Classification Search
CPC ...... H04N 23/60; H04N 23/80; H04N 25/585; G06F 9/4812; G06F 9/4881; G06F 13/24; G06T 1/20; G06T 1/0007
See application file for complete search history.

(56) References Cited

U.S. PATENT DOCUMENTS

| 7,533,201 | B2 | 5/2009 | Chew |
| 8,218,052 | B2 | 7/2012 | Upton |
| 8,629,913 | B2 | 1/2014 | Cote et al. |
| 9,215,351 | B2 | 12/2015 | Hengstler |
| 9,241,164 | B2 | 1/2016 | Saito |
| 9,986,243 | B2 | 5/2018 | Saito |
| 2014/0136746 | A1* | 5/2014 | Tiruvallur ............... G06F 13/26 710/269 |
| 2019/0179670 | A1* | 6/2019 | Kim ...................... G06F 9/5038 |

(Continued)

*Primary Examiner* — Christopher K Peterson
(74) *Attorney, Agent, or Firm* — Harness, Dickey & Pierce, P.L.C.

(57) ABSTRACT

An image signal processor includes a command queue circuit, an image processing engine and an interrupt control circuit. The command queue circuit stores a plurality of commands and sequentially provides the plurality of commands one by one. Each command of the plurality of commands includes an interrupt control value corresponding to each image unit of a plurality of image units. The plurality of commands are received from a control processor. The image processing engine receives the plurality of image units and sequentially processes the plurality of image units based on the plurality of commands sequentially provided from the command queue circuit. The interrupt control circuit receives the interrupt control value from the command queue circuit, determines one or more output interrupt event signals among a plurality of interrupt event signals based on the interrupt control value and generates an interrupt signal based on the output interrupt event signals.

20 Claims, 18 Drawing Sheets

(56) References Cited

U.S. PATENT DOCUMENTS

| | | |
|---|---|---|
| 2020/0029043 A1 | 1/2020 | McMahon |
| 2020/0084437 A1 | 3/2020 | Feekes |
| 2020/0388016 A1 | 12/2020 | Bak et al. |
| 2021/0120171 A1* | 4/2021 | Yasuda .................. H04N 23/54 |

* cited by examiner

IMAGE SIGNAL PROCESSOR AND IMAGE PROCESSING SYSTEM PERFORMING INTERRUPT CONTROL

CROSS-REFERENCE TO RELATED APPLICATION

This U.S. non-provisional application claims priority under 35 USC § 119 to Korean Patent Application No. 10-2021-0078615, filed on Jun. 17, 2021, in the Korean Intellectual Property Office (KIPO), the disclosure of which is incorporated by reference herein in its entirety.

BACKGROUND

1. Technical Field

Example embodiments relate generally to semiconductor integrated circuits, and more particularly to an image signal processor and an image processing system performing interrupt control.

2. Discussion of the Related Art

An image signal processor included in an imaging device such as a camera or a smartphone may perform image processing such as converting a data format of image data provided from an image sensor into a data format, such as RGB or YUV, or removing noise from the image data and adjusting brightness. The image signal processor may process, by units of a frame, the image data output from the image sensor. Recent imaging devices may support operation modes of providing an image at a higher frame rate such as a slow motion mode or a super slow motion mode, and the image sensor may generate and output image data at a higher frame rate.

SUMMARY

Some example embodiments may provide an image signal processor and image processing system capable of more efficiently processing image data of a higher frame rate.

Some example embodiments may provide an image signal processor and image processing system capable of more efficiently performing interrupt control.

According to example embodiments, an image signal processor includes a command queue circuit, an image processing engine and an interrupt control circuit. The command queue circuit stores a plurality of commands and sequentially provides the plurality of commands one by one. Each command of the plurality of commands includes an interrupt control value corresponding to each image unit of a plurality of image units. The plurality of commands are received from a control processor. The image processing engine receives the plurality of image units and sequentially processes the plurality of image units based on the plurality of commands sequentially provided from the command queue circuit. The interrupt control circuit receives the interrupt control value from the command queue circuit, determines one or more output interrupt event signals among a plurality of interrupt event signals based on the interrupt control value and generates an interrupt signal based on the output interrupt event signals.

According to example embodiments, an image processing system includes a control processor configured to generate a plurality of commands and execute an interrupt service routine based on an interrupt signal, each command of the plurality of commands including an interrupt control value corresponding to each image unit of a plurality of image units, and an image signal processor configured to process the plurality of image units and generate the interrupt signal. The image signal processor includes the command queue circuit, the image processing engine and the interrupt control circuit.

According to example embodiments, an image signal processor includes a command queue circuit configured to store a plurality of commands and sequentially provide the plurality of commands one by one, each command of the plurality of commands including an interrupt control value and an image unit identifier corresponding to each image unit of a plurality of image units, the plurality of commands being received from a control processor, an image processing engine configured to receive the plurality of image units and sequentially process the plurality of image units based on the plurality of commands sequentially provided from the command queue circuit, and an interrupt control circuit configured to receive the interrupt control value and the image unit identifier from the command queue circuit, determine one or more output interrupt event signals and one or more log interrupt event signals among a plurality of interrupt event signals based on the interrupt control value, generate an interrupt signal based on the output interrupt event signals, store interrupt log information including the image unit identifier and activations of the log interrupt event signals based on the log interrupt event signals.

The image signal processor and the image processing system according to example embodiments may more efficiently perform communication between the image signal processor and the control processor and/or enhance performance of the image signal processor and the image processing system by storing, in advance, the plurality of commands corresponding the plurality of image units in the command queue circuit and performing image processing based on the stored commands.

The performance may be further enhanced by determining conditions for generating the interrupt signal for each image unit based on the interrupt control value included in the command. Further the restoration procedure for errors may be more efficiently performed by determining the log interrupt event signal to be monitored based on the interrupt control value and storing the interrupt log information including the image unit identifier.

BRIEF DESCRIPTION OF THE DRAWINGS

Example embodiments of the present disclosure will be more clearly understood from the following detailed description taken in conjunction with the accompanying drawings.

DETAILED DESCRIPTION OF EXAMPLE EMBODIMENTS

Figure 1:
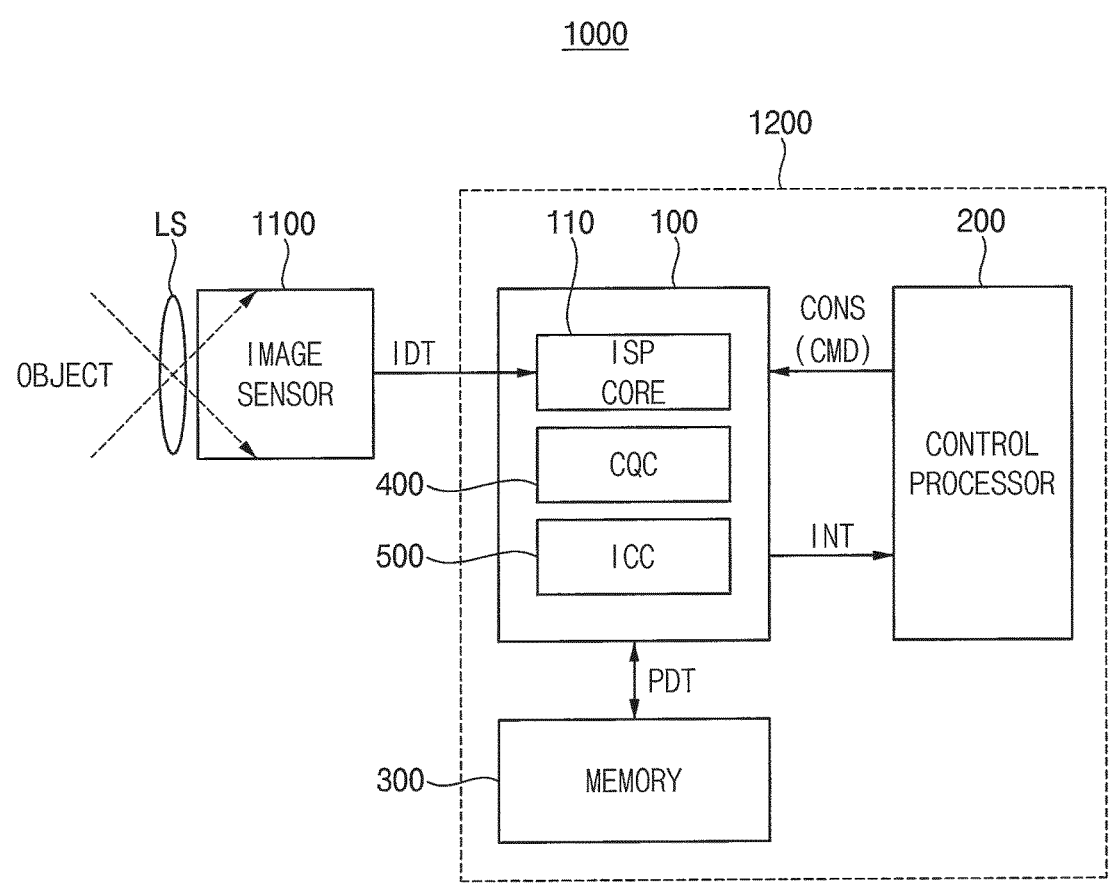
FIG. 1 is a block diagram illustrating a system according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a block diagram illustrating a system according to example embodiments.

A system 1000 of FIG. 1 may be implemented as an electronic device which captures an image and displays the captured image or performs an operation based on the captured image. The system 1000 may be implemented as, for example, a personal computer (PC), an Internet of things (IoT) device, and/or a portable electronic device. Examples of the portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, wearable device, etc. Also, the system 1000 may be equipped in an electronic device, such as a drone or an advanced drivers assistance system (ADAS), and/or an electronic device provided as a componentry in vehicles, furniture, manufacturing facilities, and various measuring machines.

Referring to FIG. 1, the system 1000 may include an image sensor 1100 and an image processing system 1200. The system 1000 may further include other elements such as a display and a user interface. The image processing system 1200 may include an image signal processor 100, a control processor 200, and/or a memory device 300. The image signal processor 100, the control processor 200, and the memory device 300 may be implemented as a single semiconductor chip or a plurality of semiconductor chips. For example, the image signal processor 100 and the control processor 200 may be integrated into one semiconductor chip.

The image sensor 1100 may convert an optical signal, which is input through an optical lens LS and corresponds to an object, into an electrical signal and may generate and output image data IDT based on electrical signals. The image sensor 1100 may include, for example, a pixel array including a plurality of pixels arranged two-dimensionally and a readout circuit, and the pixel array may convert received optical signals into the electrical signals. The pixel array may be implemented with, for example, an optical-to-electric conversion device such as a charge coupled device CCD or a complementary metal oxide semiconductor (CMOS), and in addition, may be implemented with other various kinds of optical-to-electric conversion devices. The readout circuit may generate raw data based on an electrical signal provided from the pixel array and may output, as image data IDT, the generated raw data or raw data on which preprocessing such as removing bad pixel has been performed. The image sensor 1100 may be implemented as a semiconductor chip or package including the pixel array and the readout circuit.

The image signal processor 100 may perform image processing on the image data IDT provided from the image sensor 1100. For example, the image signal processor 100 may perform image processing, such as image processing of converting a data format of the image data IDT (for example, converting an image data having a Bayer pattern into a YUV or RGB format), removing noise, adjusting brightness, and adjusting sharpness, for enhancing image quality. The image signal processor 100 may configure hardware of the image processing system 1200.

The image signal processor 100 may include an image signal processing core 110 (hereinafter referred to as an ISP core), a command queue circuit CQC 400 and/or an interrupt control circuit ICC 500. As will be described below with reference to FIG. 5, The ISP core 110 may perform, by units of an image unit, image processing on the image data IDT output from the image sensor 1100. As will be described below with reference to FIG. 5, the image unit may be an image frame, an image strip or an image tile. In this disclosure, example embodiments are described based on image frames, and it will be understood that example embodiments may be applied to image units of various types. Hereinafter, an image frame may be briefly referred to as a frame.

Processing data PDT (for example, an image-processed frame (hereinafter referred to as converted image data) and/or result data (statistic data, histogram, etc.) generated through image processing) generated through image processing may be stored in the memory device 300.

The command queue circuit 400 may receive and store a plurality of commands CMD from the control processor 200 and sequentially provide the plurality of commands CMD one by one. Each command CMD may include an interrupt control value corresponding to each image unit of a plurality of image units. In some example embodiments, as will be described below with reference to FIG. 13, the command queue circuit 400 may determine a providing order based on priories of the commands CMD.

The ISP core 110 may be referred to as an image processing engine. The image processing engine 110 may receive the image data IDT including the plurality of image units and sequentially process the plurality of image units based on the plurality of commands CMD sequentially provided from the command queue circuit 400.

As such, the image signal processor 100 and the image processing system 1200 according to example embodiments may more efficiently perform communication between the image signal processor 100 and the control processor 200 and enhance performance of the image signal processor 100 and the image processing system 1200 by storing, in advance, the plurality of commands CMD corresponding the plurality of image units in the command queue circuit 400 and performing image processing based on the stored commands CMD.

The interrupt control circuit 500 may receive the interrupt control value from the command queue circuit 400, and determine one or more output interrupt event signals among a plurality of interrupt event signals based on the interrupt control value. The interrupt control circuit 500 may generate an interrupt signal INT based on the output interrupt event signals. Example embodiments of configurations and operations of the interrupt control circuit 500 will be further described with reference to FIGS. 6 through 14.

The control processor 200 may control the image signal processor 100 to perform image processing. The control processor 200 may include processing circuitry such as hardware including logic circuits; a hardware/software combination such as a processor executing software; or a combination thereof, for example to configure software of the image processing system 1200. The control processor 200 may be a central processing unit (CPU), a microprocessor, an ARM processor, an X86 processor, a microprocessor without interlocked pipeline stages (MIPS) processor, a graphics processing unit (GPU), a general-use GPU, and/or another processor configured to execute instructions stored in a memory. The control processor 200 may process or execute data and an instruction code (or programs) including an execution algorithm of the image signal processor 100 to generate control signals CONS for controlling the image signal processor 100.

The commands CMD may be considered as being included in the control signals CONS or being distinct from the control signals CONS. The control signals CONS may include various information on image quality to be applied to the image processing, setting values for operations of the image signal processor 100, an address of the memory device 300 in which the processing data PDT are stored, etc. Some information may be included in the commands CMD.

The control processor 200 may transfer the command to the image signal processor 100 before the image unit corresponding to the command CMD is input to the image processing engine 110, and the command queue circuit 400 may store the command CMD in advance before the image processing engine 110 performs image processing of the image unit. The control processor 200 may perform an interrupt service routine ISR based on the interrupt signal INT provided form the image signal processor 100.

The memory device 300 may store the processing data PDT received from the image signal processor 100 and may provide the processing data PDT to the image signal processor 100, the control processor 200, or the system 1000.

The memory device 300 may be implemented as a volatile memory or a non-volatile memory. Examples of the volatile memory may include dynamic random access memory (DRAM), static random access memory (SRAM), etc., and examples of the non-volatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), etc.

Figure 2:
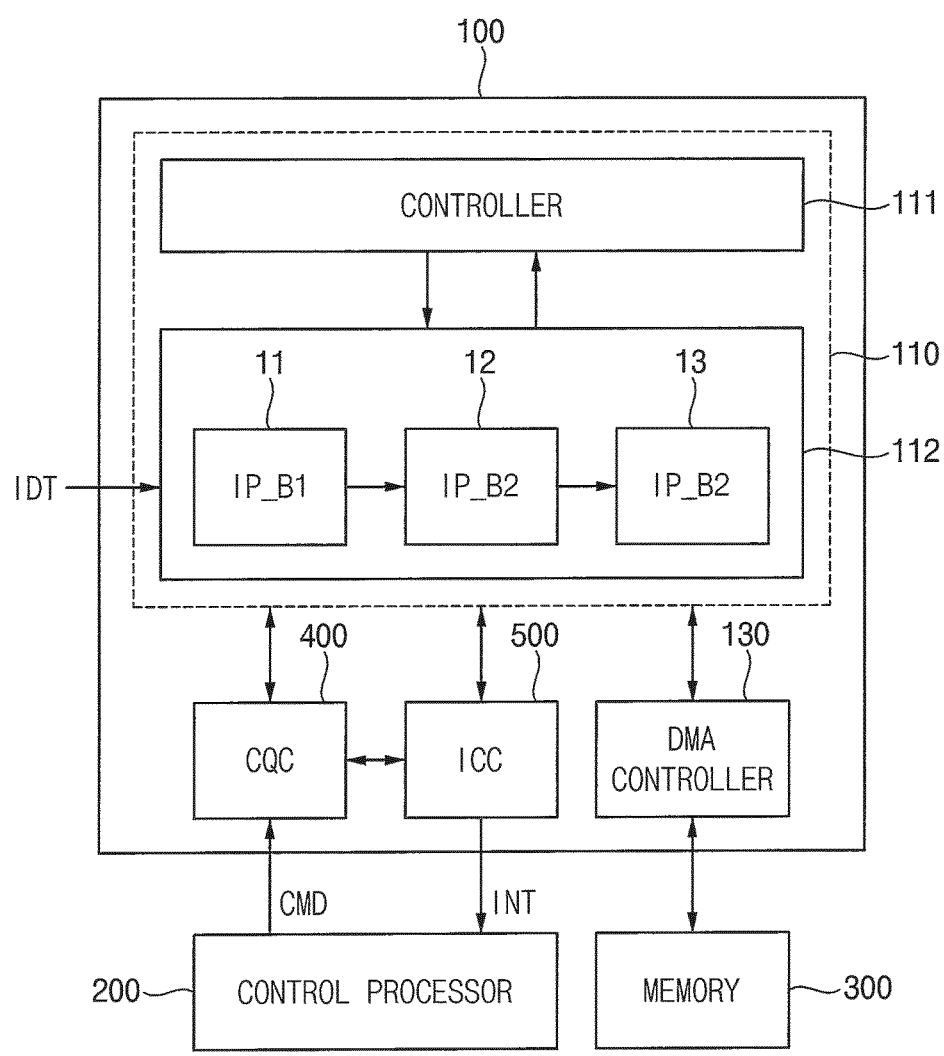
FIG. 2 is a block diagram illustrating an image signal processor according to example embodiments.

FIG. 2 is a block diagram illustrating an image signal processor according to example embodiments. FIG. 2 illustrates in detail the image signal processor 100 of FIG. 1, and also the control processor 200 and the memory device 300 are illustrated in FIG. 2.

Referring to FIG. 2, an image signal processor 100 may include an ISP engine 110, a command queue circuit CQC 400, an interrupt control circuit ICC 500, and/or a direct memory access (DMA) controller 130. The ISP engine 110 may include a controller 111 and/or a plurality of intellectual property (IP) blocks 112. In FIG. 2, the plurality of IP blocks 112 are illustrated as including first to third IP blocks 11 to 13 (e.g., IP_B1, IP_B2 and IP_B3), but are not limited thereto and may include two or more IP blocks.

The controller 111 may receive control signals CONS from the control processor 200 and may control an overall operation of the image signal processor 100 based on the control signals CONS. The control signals CONS may include the command CMD and various setting information. The controller 111 may provide the setting information to the plurality of IP blocks 112 or the DMA controller 130.

The plurality of IP blocks 112 (e.g., the first to third IP blocks 11 to 13) set as an image processing block may perform image processing, and the first to third IP blocks 11 to 13 may perform different image processing. In some example embodiments, the first IP block 11 may convert a data format of image data IDT, the second IP block 12 may adjust brightness, and the third IP block 13 may adjust contrast. The first to third IP blocks 11 to 13 may sequentially perform image processing on a frame. An image-processing-completed frame and/or result data (for example, converted image data) obtained based on image processing by each of the first to third IP blocks 11 to 13 may be stored in the memory device 300. The plurality of IP blocks 112 may receive a setting value corresponding to a processed frame from the controller 111 and/or the command queue circuit 400 and may perform image processing on a corresponding frame based on the setting value.

The DMA controller 130 may store the processing data PDT, received from at least one of the first to third IP blocks 11 to 13, in the memory device 300. The processing data PDT may include result data and/or converted image data based on image processing. In some example embodiments, the DMA controller 130 may receive an address (or an address register value) from the controller 111 and/or the command queue circuit 400 and may store the processing data PDT in a storage area, corresponding to the address, of the memory device 300.

The command queue circuit 400 may receive and store a plurality of commands CMD from the control processor 200 and sequentially provide the plurality of commands CMD one by one. The image processing engine 110 may receive the image data IDT including the plurality of image units (e.g., image frames) and sequentially process the plurality of image units based on the plurality of commands CMD sequentially provided from the command queue circuit 400.

The interrupt control circuit 500 may receive the interrupt control value from the command queue circuit 400, and determine one or more output interrupt event signals among a plurality of interrupt event signals based on the interrupt control value. The interrupt control circuit 500 may generate an interrupt signal INT based on the output interrupt event signals. In addition, the interrupt control circuit 500 may generate and store interrupt log information based on the interrupt control value and the image unit identifier. Example embodiments of configurations and operations of the interrupt control circuit 500 will be further described with reference to FIGS. 6 through 14.

Figure 3:
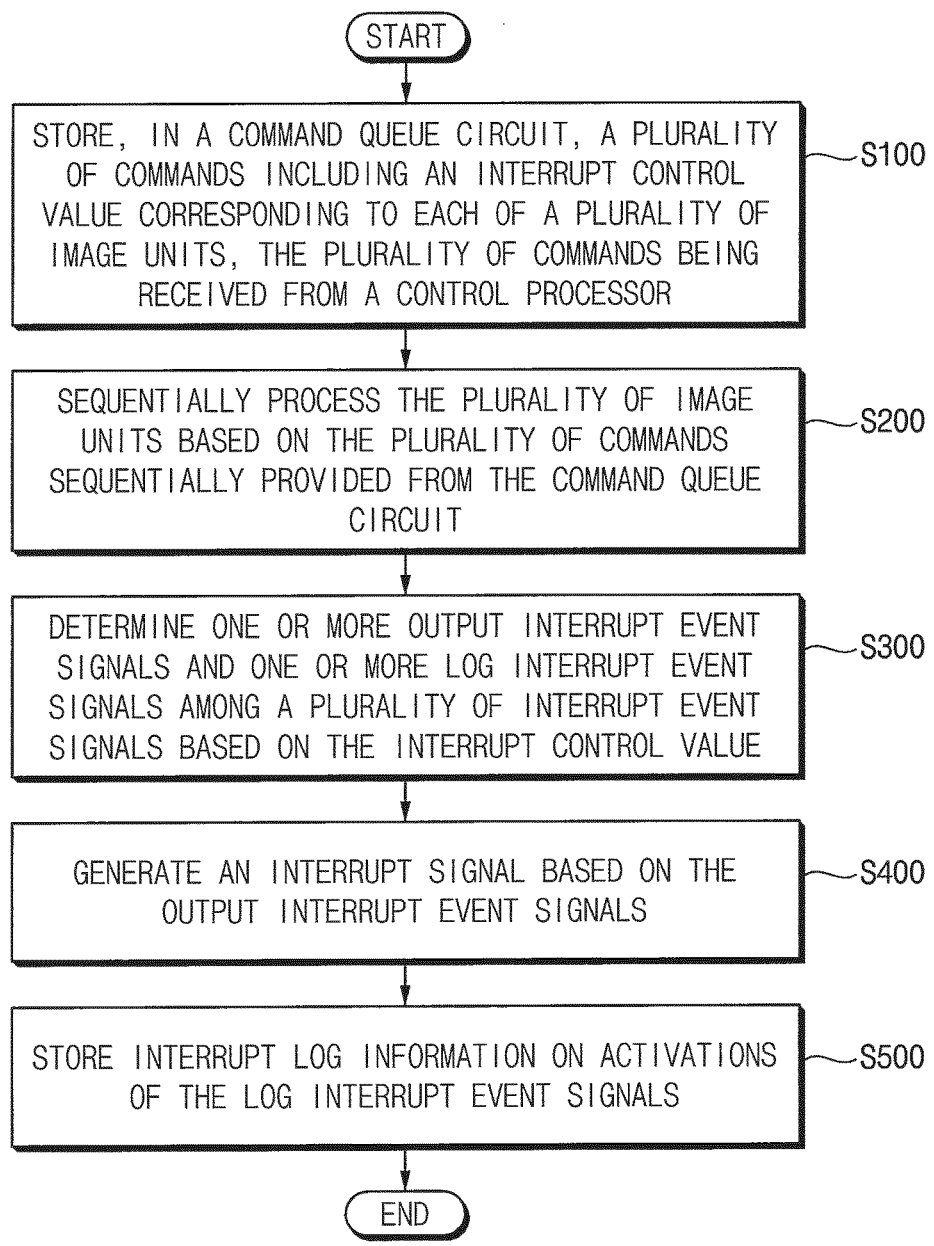
FIG. 3 is a flowchart illustrating a method of controlling an interrupt in an image signal processor according to example embodiments.

FIG. 3 is a flowchart illustrating a method of controlling interrupt in an image signal processor according to example embodiments.

Referring to FIGS. 1 through 3, the command queue circuit 400 in the image signal processor 100 may receive and store a plurality of commands CMD including an interrupt control value corresponding to each of a plurality of image units (S100). The plurality of commands may be received from a control processor.

The ISP engine 110 in the image signal processor 100 may sequentially process the plurality of image units based on the plurality of commands CMD sequentially provided from the command queue circuit 500 (S200).

The interrupt control circuit 500 in the image signal processor 100 may determine one or more output interrupt event signals and one or more log interrupt event signals among a plurality of interrupt event signals based on the interrupt control value (S300).

The interrupt control circuit 500 may generate an interrupt signal INT based on the output interrupt event signals (S400). In addition, the interrupt control circuit 500 may store interrupt log information on activations of the log interrupt event signals (S500).

Example embodiments of determining the output interrupt event signals and the log interrupt event signals, generating the interrupt signal INT and storing the interrupt log information will be described with reference to FIGS. 6 through 14.

Figure 4:
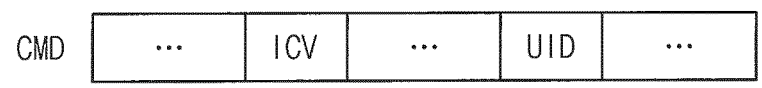
FIG. 4 is a diagram illustrating example embodiments of a command received by an image signal processor according to example embodiments.

FIG. 4 is a diagram illustrating example embodiments of a command received by an image signal processor according to example embodiments.

Referring to FIG. 4, a command CMD, which is transferred from the control processor 200 to the image signal processor 100 may include at least an interrupt control value ICV and an image unit identifier UID. Each of the interrupt control value ICV and the image unit identifier UID may include a plurality of bits.

FIG. 4 illustrates only information for describing example embodiments. Various information may be included in the command CMD. The control processor 200 may generate the command CMD as a packet including a plurality of field. The image signal processor 100 may parse the command CMD in the packet form and store the parsed information in the command queue circuit 400.

Figure 5:
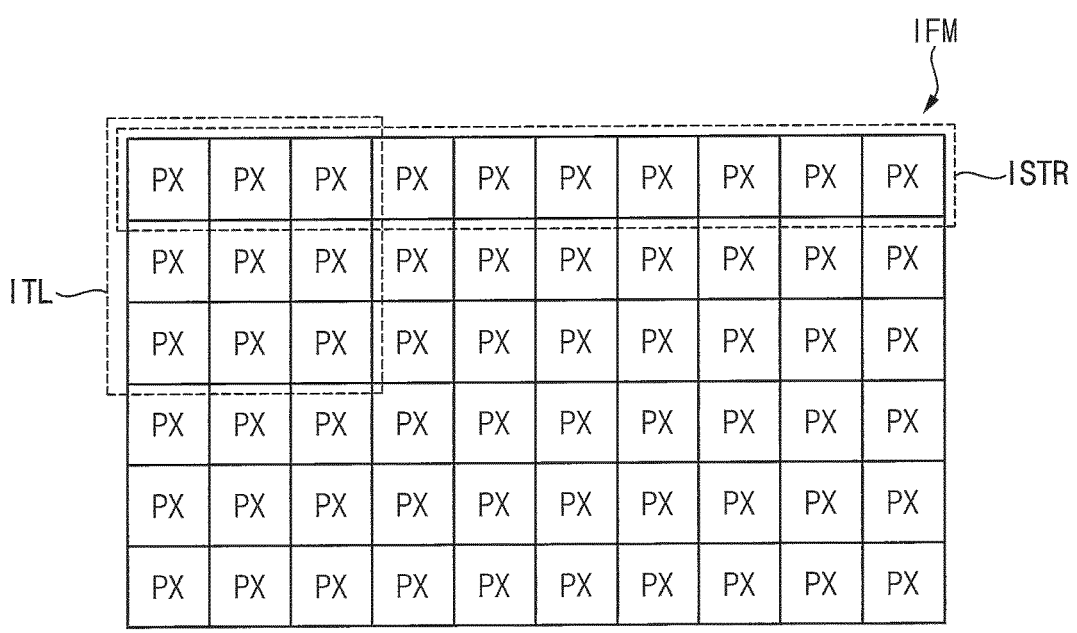
FIG. 5 is a diagram illustrating an image unit processed by an image signal processor according to example embodiments.

FIG. 5 is a diagram illustrating an image unit processed by an image signal processor according to example embodiments.

Referring to FIG. 5, an image frame IFM may include a plurality of pixel data PX that are arranged in a matrix of rows and columns. The image sensor 1100 in FIG. 1 may provide the image data IDT by units of an image frame IFM to the image signal processor 100.

The image signal processor 100 may perform image processing on the image frame IFM by units of an image frame IFM, an image strip ISTR or an image tile ITL. In other words, an image unit mentioned in this disclosure may be image frame IFM, an image strip ISTR or an image tile ITL. Even though not illustrated in FIG. 1, the image signal processor 100 may include a frame buffer to store at least one image frame IFM, and may sequentially process a plurality of image units that are sequentially provided from the frame buffer.

Figure 6:
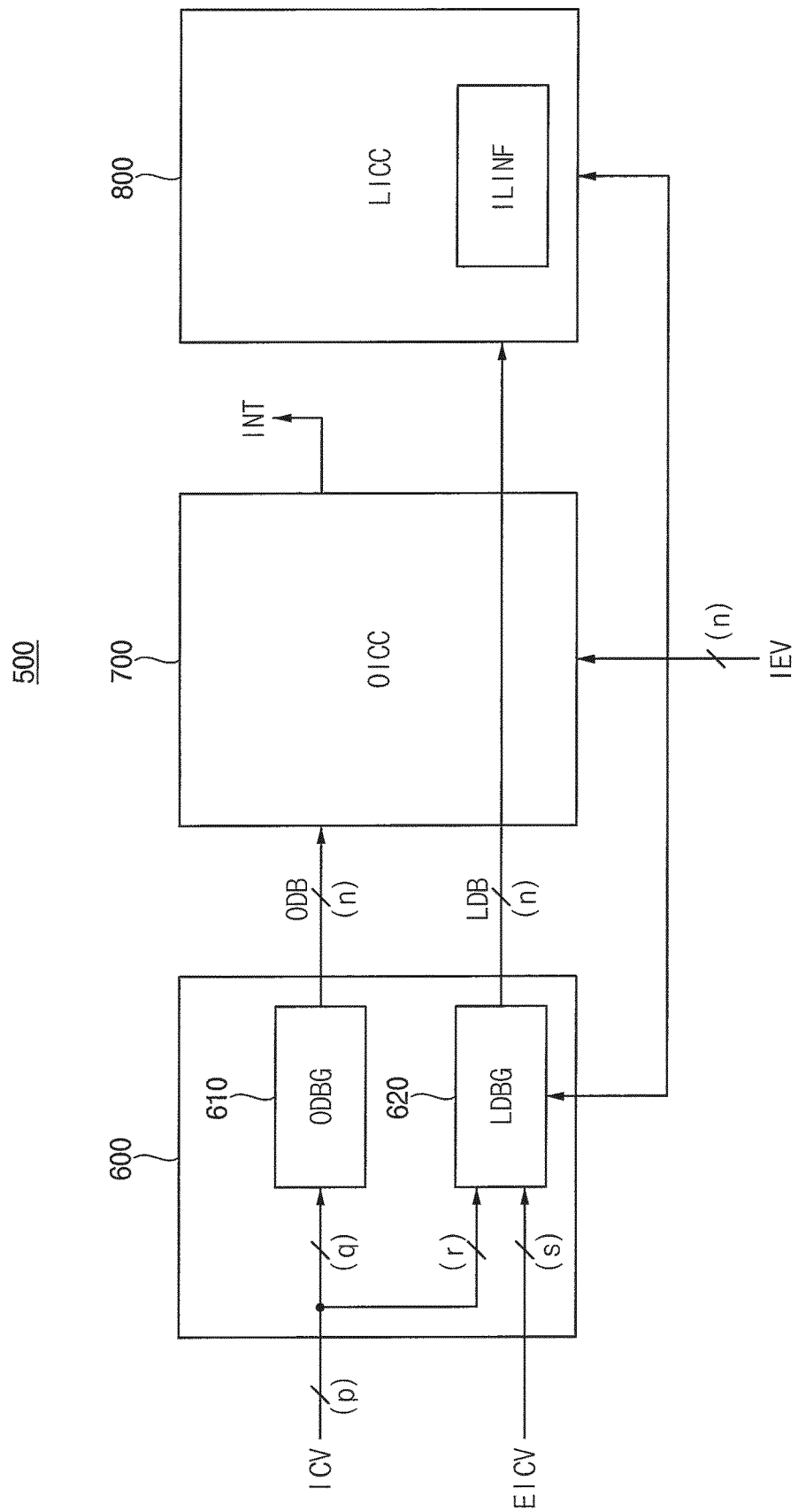
FIG. 6 is a block diagram illustrating example embodiments of an interrupt control circuit included in an image signal processor according to example embodiments.

FIG. 6 is a block diagram illustrating example embodiments of an interrupt control circuit included in an image signal processor according to example embodiments.

Referring to FIG. 6, an interrupt control circuit 500 may include a decision bit generator 600, an output interrupt control circuit OICC 700 and/or a log interrupt control circuit LICC 800.

The decision bit generator 600 may include an output decision bit generator ODBG 610 and/or a log decision bit generator LDBG 620. The output decision bit generator 610 may generate a plurality of output decision bits ODB indicating output interrupt event signals among a plurality of interrupt event signals IEV based on the interrupt control value ICV. The log decision bit generator 620 may generate a plurality of log decision bits LDB indicating log interrupt event signals among the plurality of interrupt event signals IEV based on the interrupt control value ICV.

For example, the interrupt control value ICV in each command CMD may include p bits and the number of the plurality of interrupt event signals IEV may be n. The output decision bit generator 610 may generate the n output decision bits ODB based on q bits among the p bits of the interrupt control value ICV. The log decision bit generator 620 may generate the n log decision bits LDB based on r bits among the p bits of the interrupt control value ICV. The n output decision bits ODB and the n log decision bits LDB may one-to-one correspond to the n interrupt event signals IEV. Each bit value (0 or 1) of the output decision bits ODB may indicate whether the corresponding interrupt event signal is determined as the output interrupt event signal and each bit value (0 or 1) of the log decision bits LDB may indicate whether the corresponding interrupt event signal is determined as the log interrupt event signal.

In some example embodiments, the p bits of the interrupt control value ICV may be grouped into two groups corresponding to the q bits and the r bits. In other words, p is equal to q+r. In some example embodiments, some of the q bits may be overlapped with the r bits. In other words, q+r may be smaller than p.

In some example embodiments, the log decision bit generator 620 may determine the plurality of log decision bits LDB based on s bits of an external interrupt control value EICV in addition to the r bits of the interrupt control value ICV. The external interrupt control value EICV may not be included in the command CMD, and may be provided on the fly from the control processor 200.

As described above, each command CMD may include the interrupt control value ICV and the image unit identifier UID corresponding to each image unit. Accordingly the decision bit generator 600 may generate the plurality of output decision bits ODB and the plurality of log decision bits LDB with respect to each image unit that is currently processed by the ISP engine 110, based on the interrupt control value ICV corresponding to each image unit. In other words, the decision bit generator 600 may determine the output interrupt event signals and the log interrupt event signals with respect to each image unit that is currently processed.

In some example embodiments, the log decision bit generator 620 may receive at least a portion of the plurality of interrupt event signals IEV. The log decision bit generator 620 may change the values of the log decision bits LDB based on activations of the received interrupt event signals while the corresponding image is processed.

As will be described below with reference to FIG. 7, the output interrupt control circuit 700 may generate the interrupt signal INT based on the plurality of interrupt event signals IEV and the plurality of output decision bits ODB. As will be described below with reference to FIG. 8, the log interrupt control circuit 800 may store the interrupt log information ILINF based on the plurality of interrupt event signals IEV and the plurality of log decision bits LDB. In some example embodiments, the log decision bit generator 620 may control storing of the interrupt log information ILINF based on activations of the received interrupt event signals.

Figure 7:
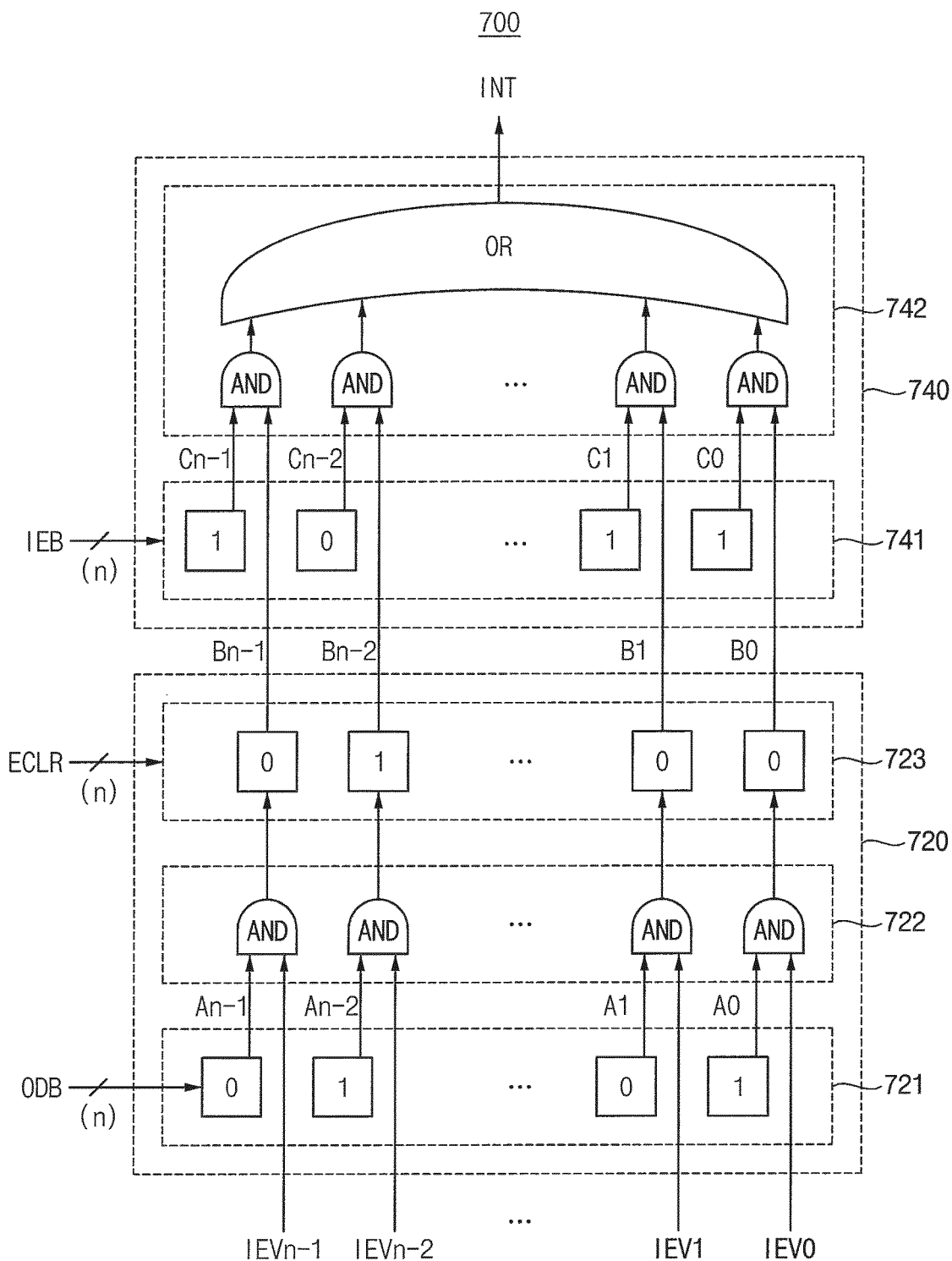
FIG. 7 is a diagram illustrating example embodiments of an output interrupt control circuit included in the interrupt control circuit of FIG. 6.

FIG. 7 is a diagram illustrating example embodiments of an output interrupt control circuit included in the interrupt control circuit of FIG. 6.

Referring to FIG. 7, the output interrupt control circuit 700 may include an output interrupt accumulation circuit 720 and/or an interrupt generator 740.

The output interrupt accumulation circuit 720 may generate a plurality of output state bits, that is, first through n-th output state bits B0~Bn-1 indicating activations of the output interrupt event signals based on the plurality of interrupt event signals IEV, that is, first through n-th interrupt event signals IEV0~An-1 and the plurality of output decision bit, that is, first through n-th output decision bits A0~An-1. The interrupt generator 740 may generate the interrupt signal INT based on the first through n-th output state bits B0~Bn-1.

The output interrupt accumulation circuit 720 may include an output decision register circuit 721, an output comparison circuit 722 and/or an output state register circuit 723.

The output decision register circuit 721 may store the first through output decision bits A0~An-1 provided from the decision bit generator 600. The output comparison circuit 722 may generate each of the first through n-th output state bits B0~Bn-1 by comparing each of the first through n-th output decision bits A0~An-1 and each of the first through n-th interrupt event signals IEV0~IEVn-1. The output state register circuit 723 may store the first through n-th output state bits B0~Bn-1. The output state register circuit 723 may be reset based on an external reset signal ECLR that is provided from the control processor 200.

In some example embodiments, the interrupt generator 740 may receive interrupt enable value from the control processor 200. For example, the interrupt enable value may include a plurality of interrupt enable bits IEB, that is, first through n-th interrupt enable bits C0~Cn-1.

The interrupt generator 740 may determine one or more enable interrupt event signals among the output interrupt event signals based on the first through n-th interrupt enable bits C0~Cn-1, and generate the interrupt signal INT based on the enable interrupt event signals.

In some example embodiments, the interrupt generator 740 may include an enable register circuit 741 and/or an enable comparison circuit 742.

The enable register circuit 741 may store the first through n-th interrupt enable bits C0~Cn-1 provided from the control processor 200. The enable comparison circuit 742 may generate the interrupt signal INT by comparing each of the first through n-th output state bits B0~Bn-1 and each of the first through n-th interrupt enable bits C0~Cn-1.

In some example embodiments, as illustrated in FIG. 7, the output comparison circuit 722 may include n AND gates. In some example embodiments, among the first through n-th output decision bits A0~An-1, the output decision bits corresponding to the output interrupt event signals may be set to 1 and the other output decision bits may be set to 0. The interrupt event signal corresponding to the output decision bit having the value of 1 may be determined as the output interrupt event signal. The AND gate corresponding to the output decision bit having the value of 0 may output the value of 0 regardless of the logic level of the corresponding interrupt event signal, that is, regardless of activation of the corresponding interrupt event signal. In other words, the AND gate corresponding to the output decision bit having the value of 0 may perform a function of masking. In some example embodiments, all of the first through n-th output state bits B0~Bn-1 may be initialized to have the value of 0.

In some example embodiments, as illustrated in FIG. 7, the enable comparison circuit 742 may include n AND gates and one OR gate. In some example embodiments, among the first through n-th interrupt enable bits C0~Cn-1, the interrupt enable bits corresponding to the enable interrupt event signals may be set to 1 and the other enable decision bits may be set to 0. The AND gate corresponding to the interrupt enable bit having the value of 0 may output the value of 0 regardless of the value of the corresponding output state bit. In other words, the AND gate corresponding to the interrupt enable bit having the value of 0 may perform a function of masking. The OR gate may perform an OR logic operation on the outputs of the n AND gates to generate the interrupt signal INT.

As a result, the output interrupt control circuit 700 may activate the interrupt signal INT when at least one of the enable interrupt event signals is activated, regardless of activations of other interrupt event signals among the first through n-th interrupt event signals IEV0~IEVn-1 except the enable interrupt event signals.

In some example embodiments, the control processor 200 may not provide the interrupt enable bits C0~Cn-1, and the enable register circuit 741 may be omitted. In some example embodiments, the n AND gates in the enable comparison circuit 742 may be omitted. In some example embodiments, the OR gate may perform an OR logic operation on the first through n-th output state bits B0~Bn-1 to generate the interrupt signal INT.

Figure 8:
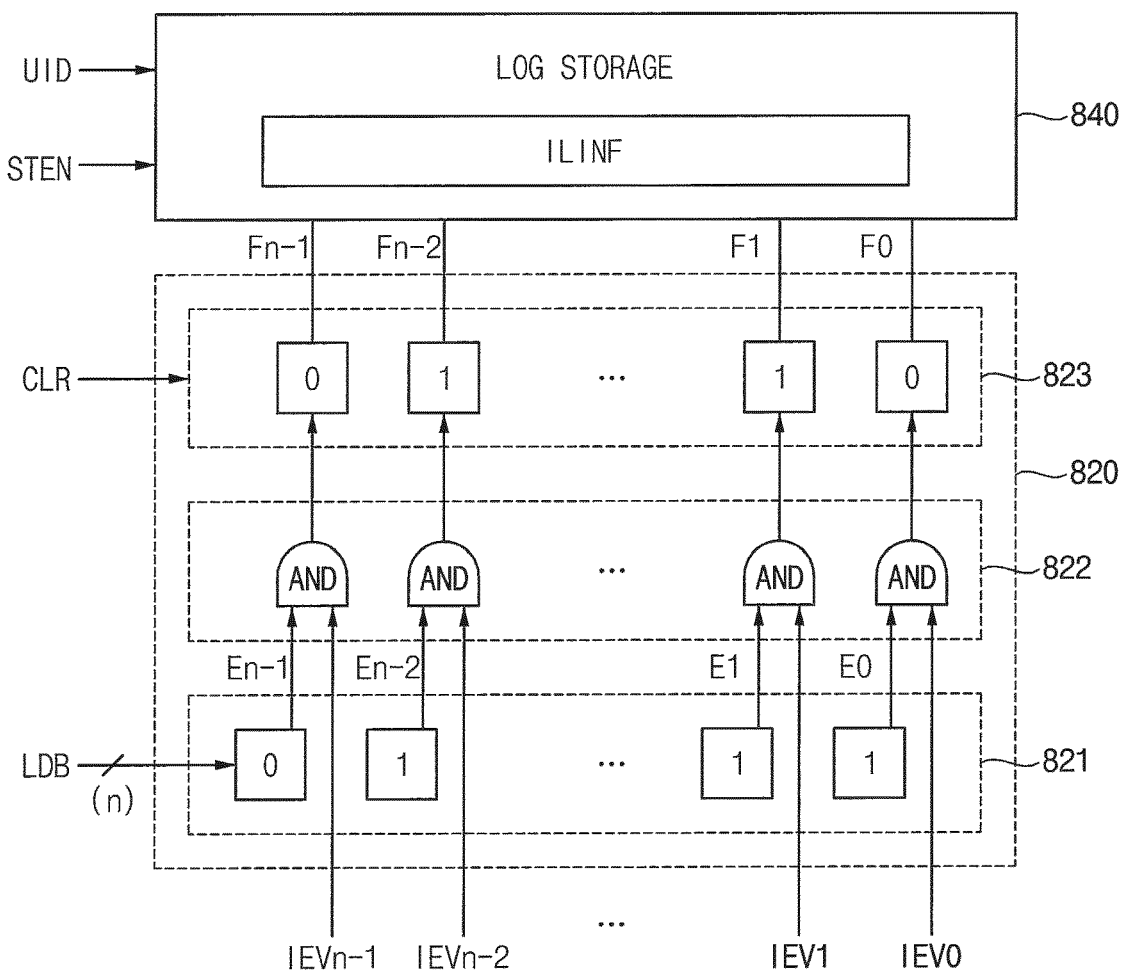
FIG. 8 is a diagram illustrating example embodiments of a log interrupt control circuit included in the interrupt control circuit of FIG. 6.

FIG. 8 is a diagram illustrating example embodiments of a log interrupt control circuit included in the interrupt control circuit of FIG. 6.

Referring to FIG. 8, the log interrupt control circuit 800 may include a log interrupt accumulation circuit 820 and/or a log storage 840.

The log interrupt accumulation circuit 820 may generate a plurality of log state bits, that is, first through n-th log state bits F0~Fn-1 indicating activations of the log interrupt event signals based on the plurality of interrupt event signals IEV, that is, first through n-th interrupt event signals IEV0~IEVn-1 and the plurality of log decision bit, that is, first through n-th log decision bits E0~En-1. The log storage 840 may store interrupt log information ILINF including the first through n-th log state bits F0~Fn-1. As will be described below, the log storage 840 may receive the image unit identifier UID from the command queue circuit 400 and store the unit interrupt information ILINF including the unit image identifier UID with respect to each image unit.

The log storage 840 may store, as the interrupt log information ILINF, unit interrupt information corresponding to a set of the first through n-th log state bits F0~Fn-1 provided from the log interrupt accumulation circuit 820 and the image unit identifier UID provided from the command queue circuit 400, when a storage enable signal STEN is activated. In some example embodiments, the storage enable signal STEN may be proved from the decision bit generator 600 in FIG. 6.

The log interrupt accumulation circuit 820 may include a log decision register circuit 821, a log comparison circuit 822 and/or a log state register circuit 823.

The log decision register circuit 821 may store the first through log decision bits E0~En-1 provided from the decision bit generator 600. The log comparison circuit 822 may generate each of the first through n-th log state bits F0~Fn-1 by comparing each of the first through n-th log decision bits E0~En-1 and each of the first through n-th interrupt event signals IEV0~IEVn-1. The log state register circuit 823 may store the first through n-th log state bits F0~Fn-1. The log state register circuit 823 may be reset based on a reset signal CLR. The reset signal CLR may be generated in the image signal processor 100 and may be activated based on timings of completing image processing of each image unit.

In some example embodiments, as illustrated in FIG. 8, the log comparison circuit 822 may include n AND gates. In some example embodiments, among the first through n-th log decision bits E0~En-1, the log decision bits corresponding to the log interrupt event signals may be set to 1 and the other log decision bits may be set to 0. The interrupt event signal corresponding to the log decision bit having the value of 1 may be determined as the log interrupt event signal. The AND gate corresponding to the log decision bit having the value of 0 may output the value of 0 regardless of the logic level of the corresponding interrupt event signal, that is, regardless of activation of the corresponding interrupt event signal. In other words, the AND gate corresponding to the log decision bit having the value of 0 may perform a function of masking. In some example embodiments, all of the first through n-th log state bits F0~Fn-1 may be initialized to have the value of 0.

Figure 9:
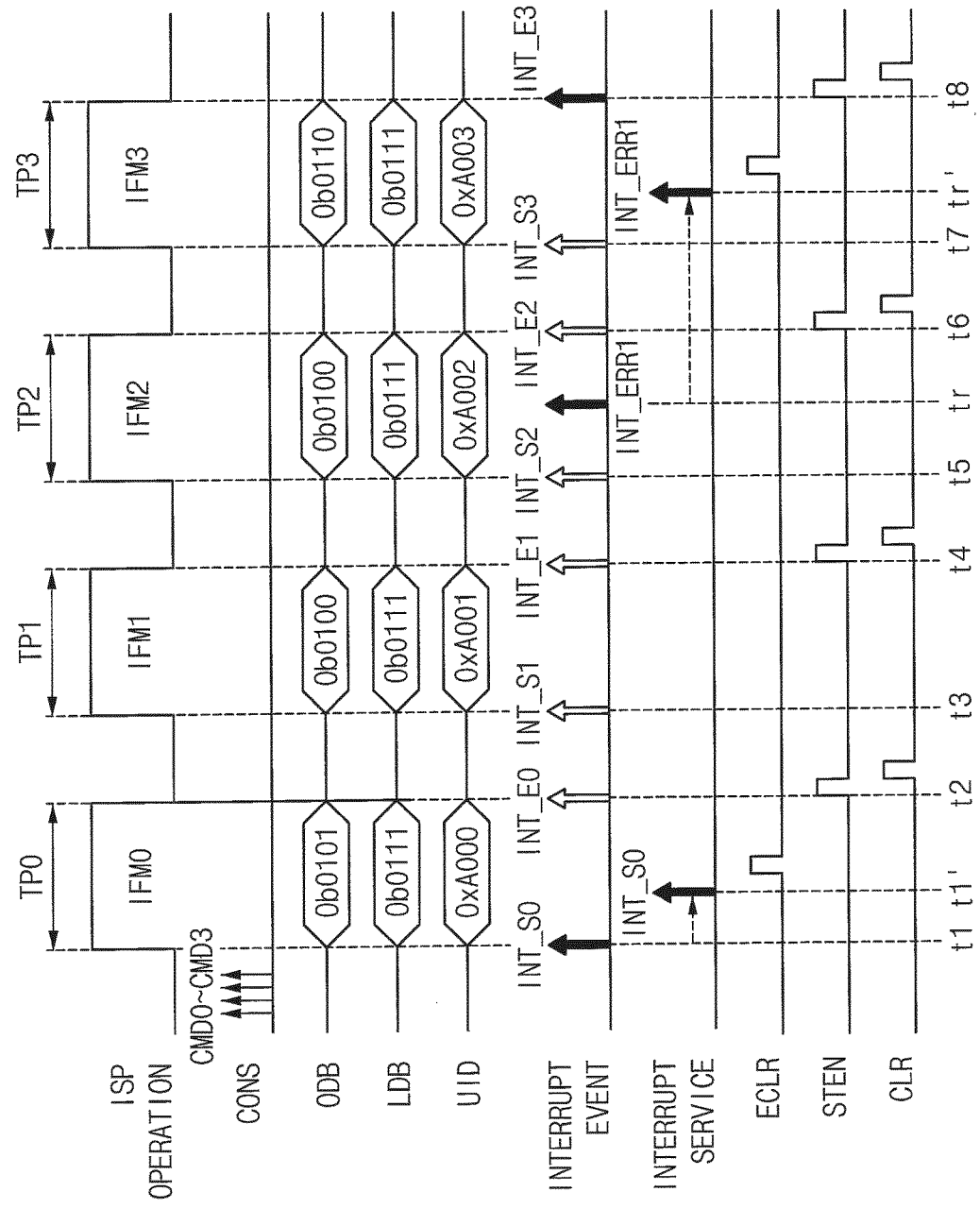
FIG. 9 is a timing diagram illustrating example embodiments of an operation of an image processing system according to example embodiments.
Figure 10:
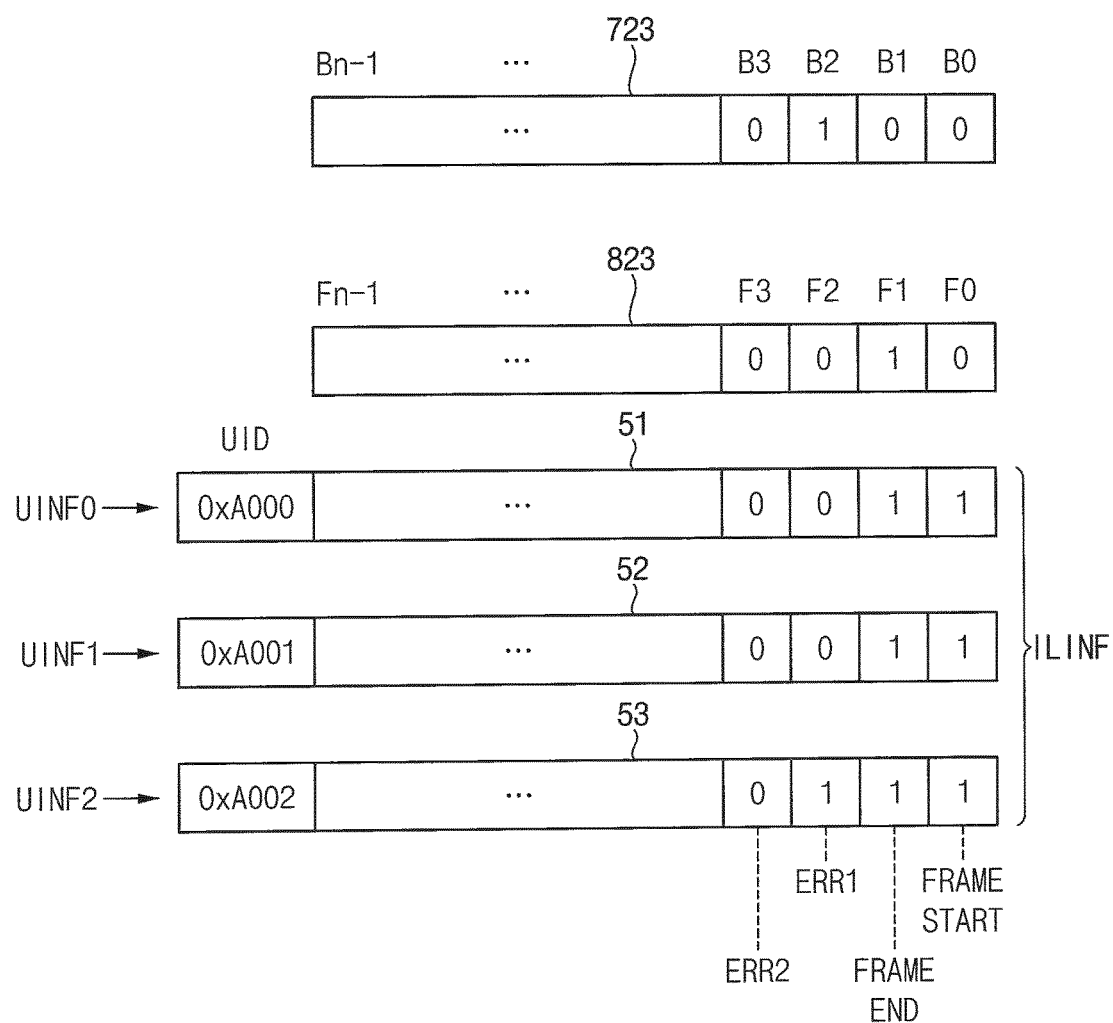
FIG. 10 is a diagram illustrating interrupt log information according to the operation of FIG. 9.

FIG. 9 is a timing diagram illustrating example embodiments of an operation of an image processing system according to example embodiments, and FIG. 10 is a diagram illustrating interrupt log information according to the operation of FIG. 9.

Hereinafter, for convenience of illustration and description, example embodiments are described based on the first through fourth interrupt event signals IEV0~IEV3 among the plurality of interrupt event signals IEV.

For example, as represented in FIGS. 8 and 10, the first interrupt event signal IEV0 may be activated when a frame start event occurs, the second interrupt event signal IEV1 may be activated when a frame end event occurs, the third interrupt event signal IEV2 may be activated when a first error ERR1 occurs, and the fourth interrupt event signal IEV3 may be activated when a second error ERR2 occurs.

Referring to FIG. 9, an image signal processor (ISP) may sequentially process first through fourth frames IFM0~IFM3 during first through fourth processing periods TP0~TP3, respectively.

As described above, the first through fourth commands CMD0~CMD3 corresponding to the first through fourth frames IFM0~IFM3 may be provided as the control signals CONS from the control processor 200 before the image processing of the corresponding frame begins, and stored in the command queue circuit 400.

FIG. 9 illustrates example values of the output decision bits ODB, the log decision bits LDB and the image unit identifier UID, respectively corresponding to the first through fourth frames IFM0~IFM3.

As illustrated in FIG. 9, the frame start events INT_S0~INT_S3 and the frame end events INT_E0~INT_E3 may occur at time points t1~t8, respectively. The output interrupt event signals may be determined according to the values of the plurality of output decision bits ODB, and the log interrupt event signals may be determined according to the values of the plurality of log decision bits LDB, among the plurality of interrupt event signals IEV.

For example, during the first processing period TP0, the values "A3A2A1A0" of the first through fourth output decision bits corresponding to the first frame IFM0 may be determined as '0101'. In other words, the first output decision bit A0 corresponding the frame start event and the third output decision bit A2 corresponding the first error ERR1 may have the value of 1 and the second output decision bit A1 corresponding the frame end event and the fourth output decision bit A3 corresponding the second error ERR2 may have the value of 0. Accordingly the first interrupt event signal IEV0 and the third interrupt event signal IVE2 may correspond to the output interrupt event signals. In FIG. 9, the interrupt events that contribute to activation of the interrupt signal INT are represented with the dark arrows and the interrupt events that do not affect activation of the interrupt signal INT (that is, that are masked) are represented with the white arrows.

For example, the first error ERR1 may occur and the first error event INT_ERR1 may occur at time point tr while the third frame IFM2 is processed. Even though the interrupt events INT_S0 and INT_ERR1 occur at time points t1 and tr, a delay may be caused according to the operation state of the control processor 200 and the interrupt service routine may be executed at time points t1' and tr'.

The storage enable signal STEN may be activated at time points corresponding end of the first through fourth processing periods TP0~TP3 as illustrated in FIG. 9. Based on activation of the storage enable signal STEN, the unit interrupt information corresponding to each image unit (e.g., each frame) may be stored in the log storage 840 as illustrated in FIG. 10. After the unit interrupt information corresponding to each image unit is stored, the reset signal CLR is activate to initialize the log state bits to the value of 0.

FIG. 10 illustrates the output state bits B0~B3, the log state bits F0~F3 and the first through third unit interrupt information UINF1~UNIF2 corresponding to time point tr' in FIG. 9. As described above, the output state bits F0~F3 are stored in the output state register circuit 723, the log state bits F0~F0 may be stored in the log state register circuit 823, and the interrupt log information including the first through third unit interrupt information UNIF0~UINF2 may be stored in a plurality of store units 51~53 in the log storage 840.

As illustrated in FIG. 10, each of the first through third unit interrupt information UINF1~UNIF2 may include the image unit identifier UID and the values of the log state bits F0~F3 respectively corresponding to the first through third frames IFM0~IFM2.

The control processor 200 may drop the first through third frames IFM0~IFM2 if only the output state bits B0~B0 are considered, because the control processor 200 cannot determine when the first error ERR1 occurred. In contrast, the control processor 200 may drop only the third frame IFM2 if the interrupt log information ILINF are considered because the control processor 200 may determine that the first error ERR1 occurred while the third frame IFM2 is processed.

Various operation modes including a fast readout (FRO) mode requiring image processing of higher frame rates such as 120 fps, 240 fps, 480 fps, etc. may be embodied more efficiently by determining the plurality of output decision bits ODB, for example, e.g., the first through fourth output decision bits A0~A3 respectively for each of the first through fourth processing periods TP0~TP3.

In conventional schemes, the FRO mode is performed such that an interrupt generation is controlled by units of N frames. In the conventional FRO mode, the image signal processor includes a counter to count the N frames and the frame start interrupt is permitted in the first frame of the N frames and the frame end event is permitted in the last frame of the N frames, by a logic circuit of a fixed pattern. In some example embodiments, N set of configuration registers are required, which increase system overhead, and image quality of the processed data may be degraded because the same setting values are applied to the N frames. In addition, the operation of the image signal processor has to be halted for conversion between the FRO mode and the normal mode and thus it is difficult to more efficiently use interrupt history function or interrupt log function.

The interrupt delay deviations are increased in an application processor (AP) even in image processing of normal frame rate such as 60 fps and 120 fps, etc. The present technology may just determine the accumulated errors at time point when the interrupt state of the image signal processor is checked but the contents of the errors may not be analyzed.

Without the interrupt history function, it cannot be determined what frame has an error among the processed frames and thus all of the processed frames have to be dropped. In addition, the processor handing the interrupt has a control bound for the maximum interrupt number that can be processed per unit time. The frame rate and the number of image sensors requiring simultaneous processing are ever increasing.

According to example embodiments, the software control of the control processor 200 may be reserved as the commands CMD stored in the command queue circuit 400 and thus recording of the interrupt may be controlled more efficiently. The FRO mode may be integrated into the normal mode of higher frame rate and thus frequency of interrupt may be controlled more efficiently with system overhead. In addition the interrupt log may be possible for all operation modes, for all types of image units (e.g., image frame, image strip, image tile, etc.) and thus drop rate may be reduced even though handling of interrupt is delayed.

Figure 11:
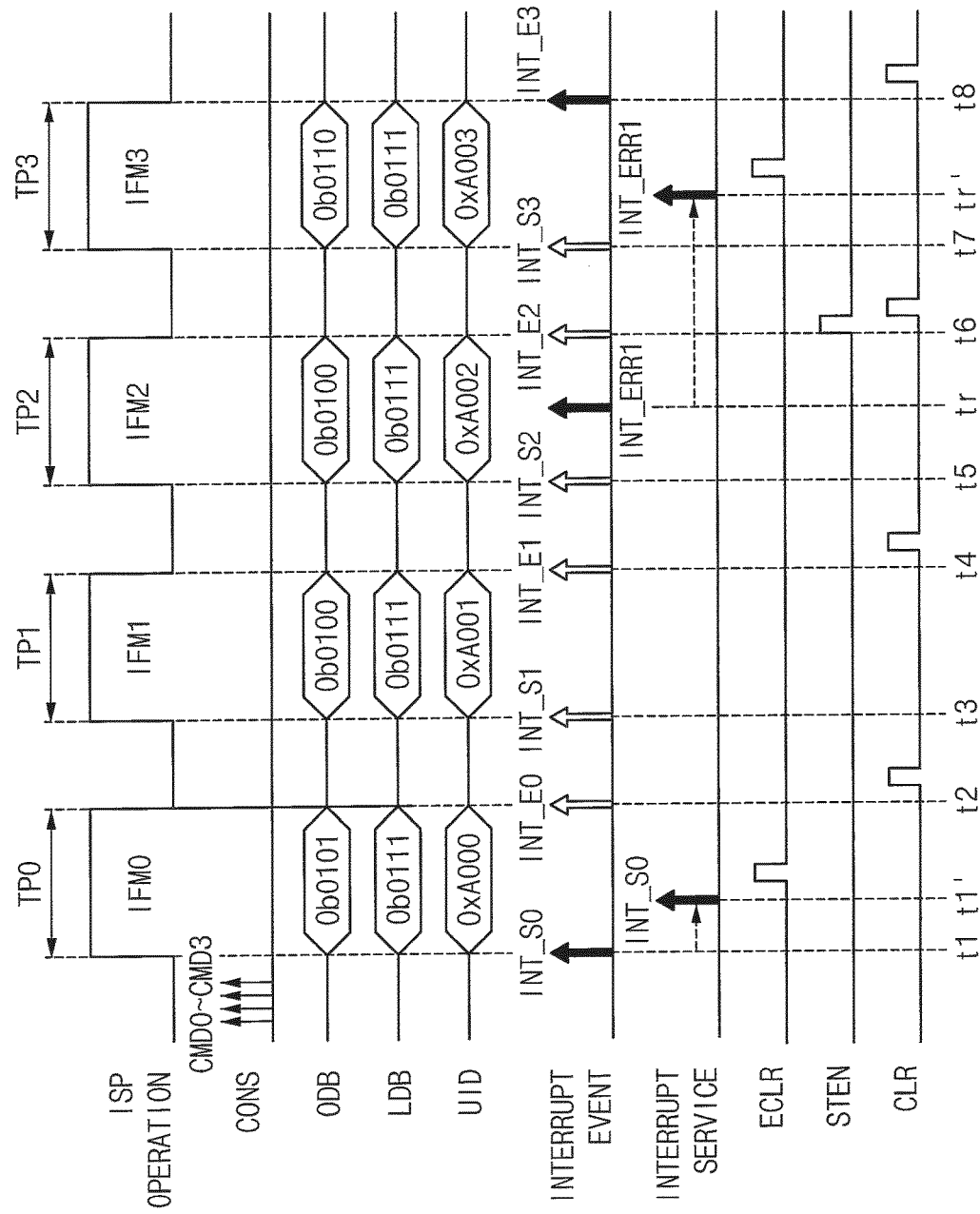
FIG. 11 is a timing diagram illustrating example embodiments of an operation of an image processing system according to example embodiments.
Figure 12:
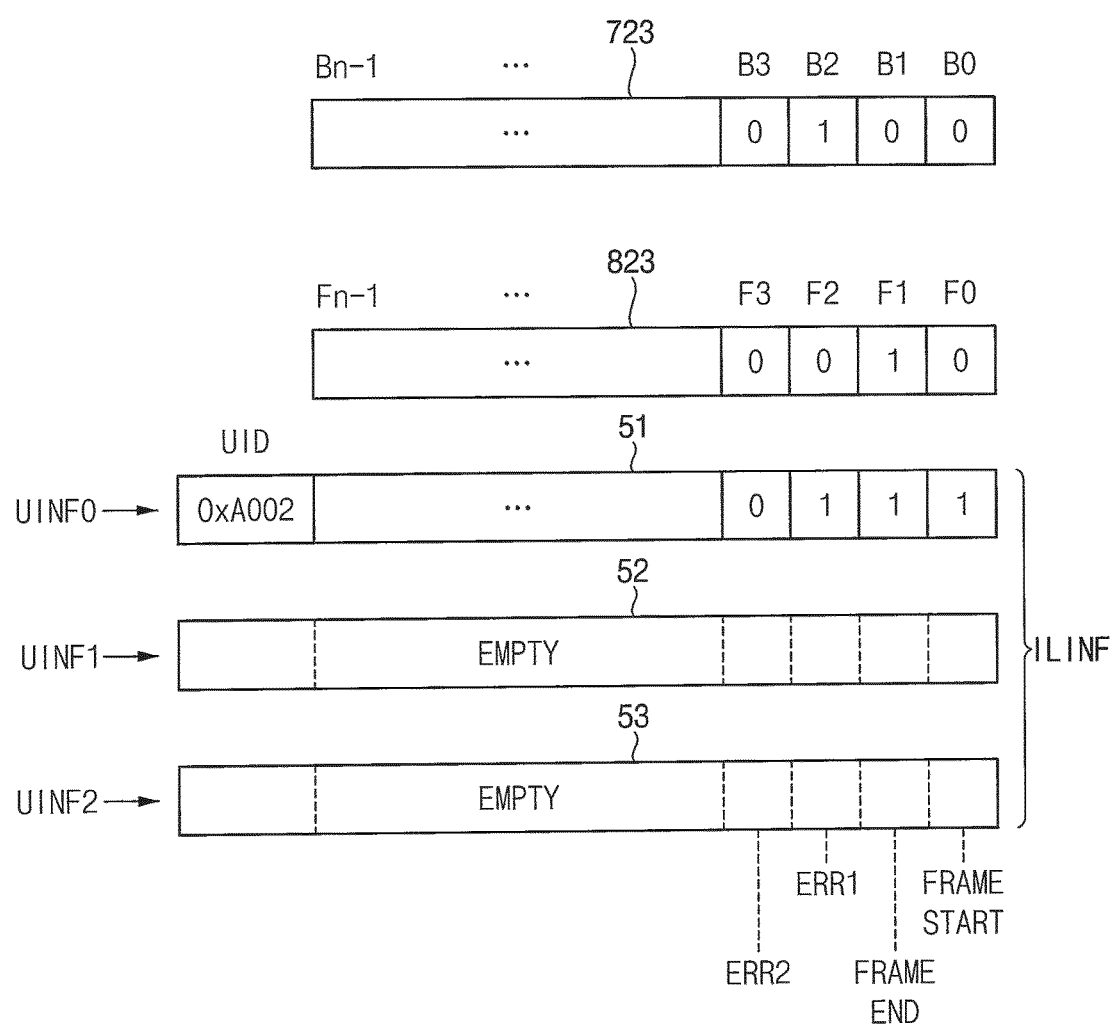
FIG. 12 is a diagram illustrating interrupt log information according to the operation of FIG. 11.

FIG. 11 is a timing diagram illustrating example embodiments of an operation of an image processing system according to example embodiments, and FIG. 12 is a diagram illustrating interrupt log information according to the operation of FIG. 11. The descriptions repeated with FIGS. 9 and 10 may be omitted.

In the example of FIGS. 9 and 10, the storage enable signal STEN may be activated at time points t2, t4, t6 and t8 corresponding to ends of the first through fourth processing periods TP0~TP3. Accordingly the log storage 840 may store the unit interrupt information for all of the first through fourth frames IFM0~IFM3.

In contrast, in an example of FIGS. 11 and 12, the storage enable signal STEN may be activated only at time point t6 corresponding to an end of the third processing period TP2 while the first error ERR1 is occurred. Accordingly the log storage 840 may store only the unit interrupt information UINF0 corresponding to the third frame IFM2 as illustrated in FIG. 12.

As such, according to example embodiments, the interrupt control circuit 500 may determine whether to store the unit interrupt information based on activations of a portion of the log interrupt event signals among the plurality of interrupt event signals IEV.

Figure 13:
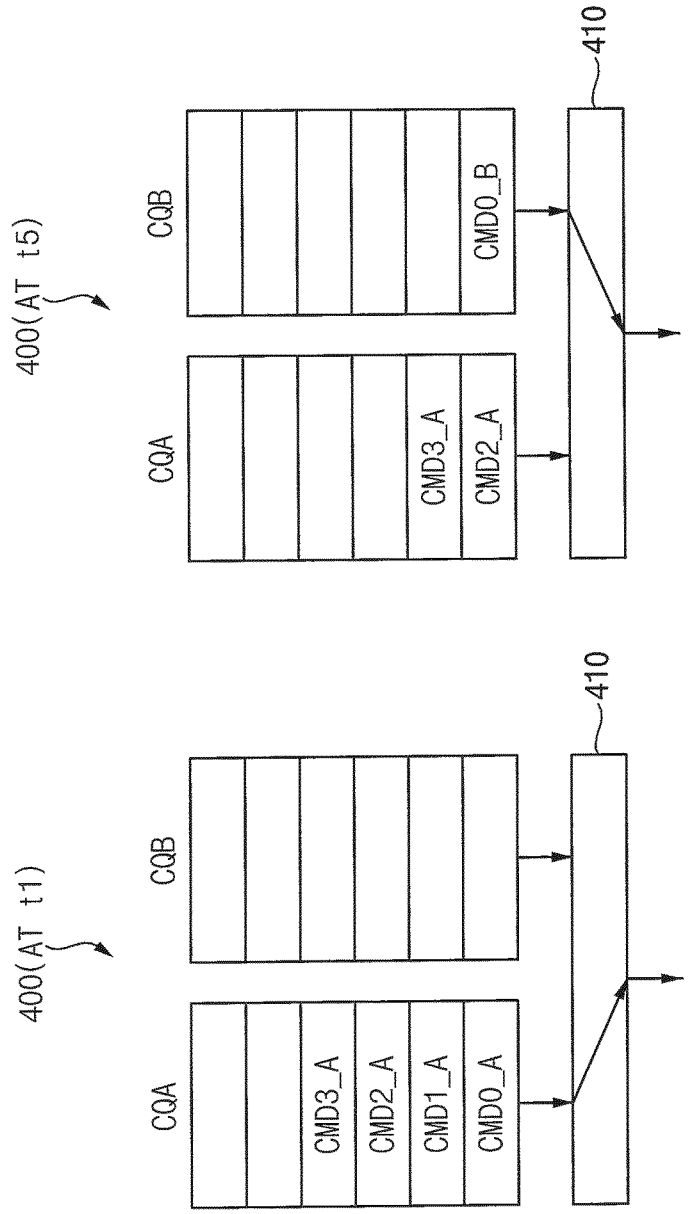
FIG. 13 is a diagram illustrating example embodiments of a command queue circuit included in the interrupt control circuit of FIG. 6.
Figure 14:
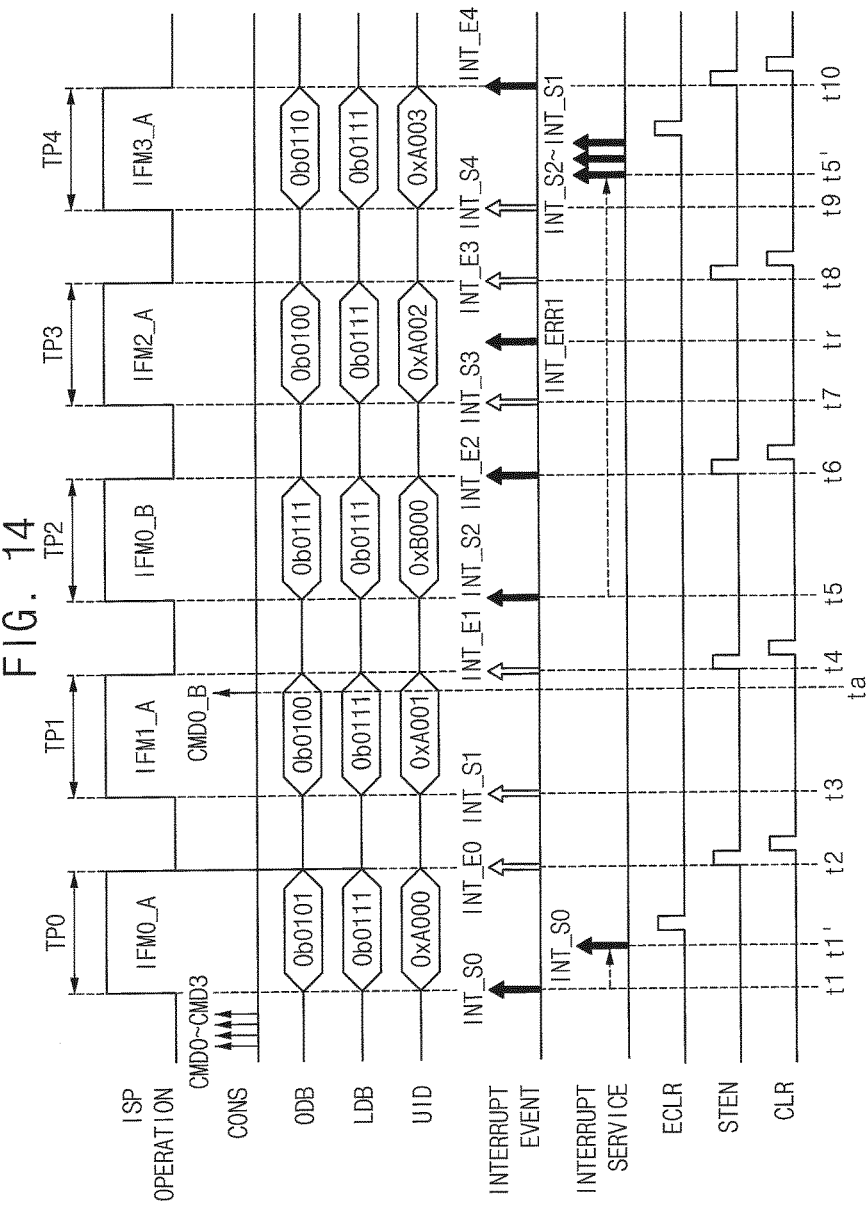
FIG. 14 is a timing diagram illustrating example embodiments of an operation of an image processing system according to example embodiments.
Figure 15:
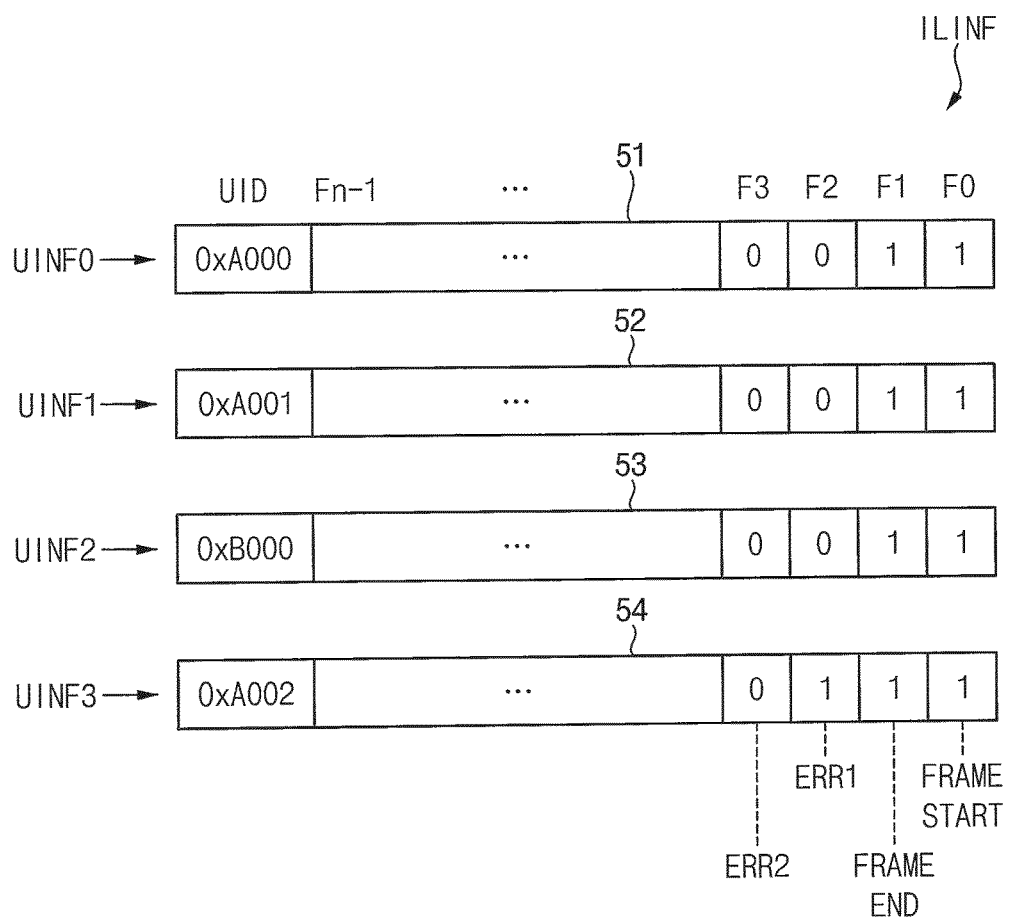
FIG. 15 is a diagram illustrating interrupt log information according to the operation of FIG. 14.

FIG. 13 is a diagram illustrating example embodiments of a command queue circuit included in the interrupt control circuit of FIG. 6, FIG. 14 is a timing diagram illustrating example embodiments of an operation of an image processing system according to example embodiments, and FIG. 15 is a diagram illustrating interrupt log information according to the operation of FIG. 14. The descriptions repeated with FIGS. 9 and 10 may be omitted.

Referring to FIG. 13, the command queue circuit 400 may include a first command queue CQA storing the commands of relatively higher priority, a second queue CQB storing the command of relatively low priority, and an arbitrator 410

Referring to FIG. 14, an image signal processor (ISP) may process the first through fourth frames IFM0_A~IFM3_A of a first stream corresponding to the low priority and the frame IFM0_B of a second stream corresponding to the higher priority during first through fifth processing periods TP0~TP4, respectively.

As described above, the first through fourth commands CMD0~CMD3 corresponding to the first through fourth frames IFM0_A~IFM3_A may be provided as the control signals CONS from the control processor 200 before the image processing of the corresponding frame begins, and stored in the command queue circuit 400. The state of the command queue circuit 400 at time point t1 such that the first through fourth commands CMD0_A~CMD3_A are stored in the first queue CQA is illustrated in the left portion of FIG. 13.

For example, the fifth command CMD0_B corresponding to the frame IFM0_B of the second frame may be received from the control processor 200 at time point to and stored in the command queue circuit 400. The state of the command queue circuit 400 at time point t5 such that the third and fourth frames CMD2_A and CMD3_A are stored in the first queue CQA and the fifth command CMD0_B is stored in the second queue CQB is illustrated in the right portion of FIG. 13.

The arbitrator 410 of the command queue circuit 400 may provide the fifth command CMD_B of the higher priority before the third command CMD2_A of the low priority. As a result, the frame IFM)_B of the second stream having the higher priority may be processed during the third processing period TP2 and then the third and fourth frames IFM2_A and IFM3_A of the first frame may be sequentially processed during the fourth and fifth processing periods TP3 and TP4 as illustrated in FIG. 14.

As illustrated in FIG. 14, the frame start events INT_S0~INT_S4 and the frame end events INT_E0~INT_E4 may occur at time points t1~t10, respectively. The output interrupt event signals may be determined according to the values of the plurality of output decision bits ODB, and the log interrupt event signals may be determined according to the values of the plurality of log decision bits LDB, among the plurality of interrupt event signals IEV.

For example, during the third processing period TP2, the values "A3A2A1A0' of the first through fourth output decision bits corresponding to the frame IFM0_B of the second stream may be determined as '0111'. In other words, the first output decision bit A0 corresponding the frame start event, the second output decision bit A1 corresponding the frame end event and the third output decision bit A2 corresponding the first error ERR1 may have the value of 1 and the fourth output decision bit A3 corresponding the second error ERR2 may have the value of 0. Accordingly the first through third interrupt event signals IEV0~IEV2 may correspond to the output interrupt event signals during the third processing period TP2. In FIG. 14, the interrupt events that contribute to activation of the interrupt signal INT are represented with the dark arrows and the interrupt events that do not affect activation of the interrupt signal INT (that is, that are masked) are represented with the white arrows.

For example, the first error ERR1 may occur and the first error event INT_ERR1 may occur at time point tr while the third frame IFM2_A is processed. Even though the interrupt events INT_S2, INT_E2 and INT_ERR1 occur at time points t5, t6 and tr, a delay may be caused according to the operation state of the control processor 200 and the interrupt service routine may be executed at time points t1' and t5'.

The storage enable signal STEN may be activated at time points corresponding end of the first through fifth processing periods TP0~TP4 as illustrated in FIG. 14. Based on activation of the storage enable signal STEN, the unit interrupt information corresponding to each image unit (e.g. each frame) may be stored in the log storage 840 as illustrated in FIG. 15. After the unit interrupt information corresponding to each image unit is stored, the reset signal CLR is activate to initialize the log state bits to the value of 0.

FIG. 15 illustrates the first through fourth unit interrupt information UINF1~UNIF3 corresponding to time point t5' in FIG. 14. The interrupt log information including the first through fourth unit interrupt information UNIF0~UINF3 may be stored in a plurality of store units 51~54 in the log storage 840.

As illustrated in FIG. 15, each of the first through fourth unit interrupt information UINF1~UNIF3 may include the image unit identifier UID and the values of the log state bits F0~F3 respectively corresponding to the first through third frames IFM0_A~IFM2_A of the first stream and the frame IFM0_B of the second stream.

The control processor 200 may drop the frames IFM0_A~IFM2_A and IFM0_B if only the output state bits B0~B0 are considered, because the control processor 200 cannot determine when the first error ERR1 occurred. In contrast, the control processor 200 may drop only the third frame IFM2_A of the first stream referring to the interrupt log information ILINF because the control processor 200 may determine that the first error ERR1 occurred while the third frame IFM2_A is processed.

Various operation modes including a fast readout (FRO) mode requiring image processing of higher frame rates such as 120 fps, 240 fps, 480 fps, etc. may be embodied more efficiently by determining the plurality of output decision bits ODB, for example, e.g., the first through fourth output decision bits A0~A3 respectively for each of the first through fourth processing periods TP0~TP3.

As such, according to example embodiments, the interrupt history may be interpreted easily even in case of multi-stream processing, and the limited storage space may be used more efficiently.

Figure 16:
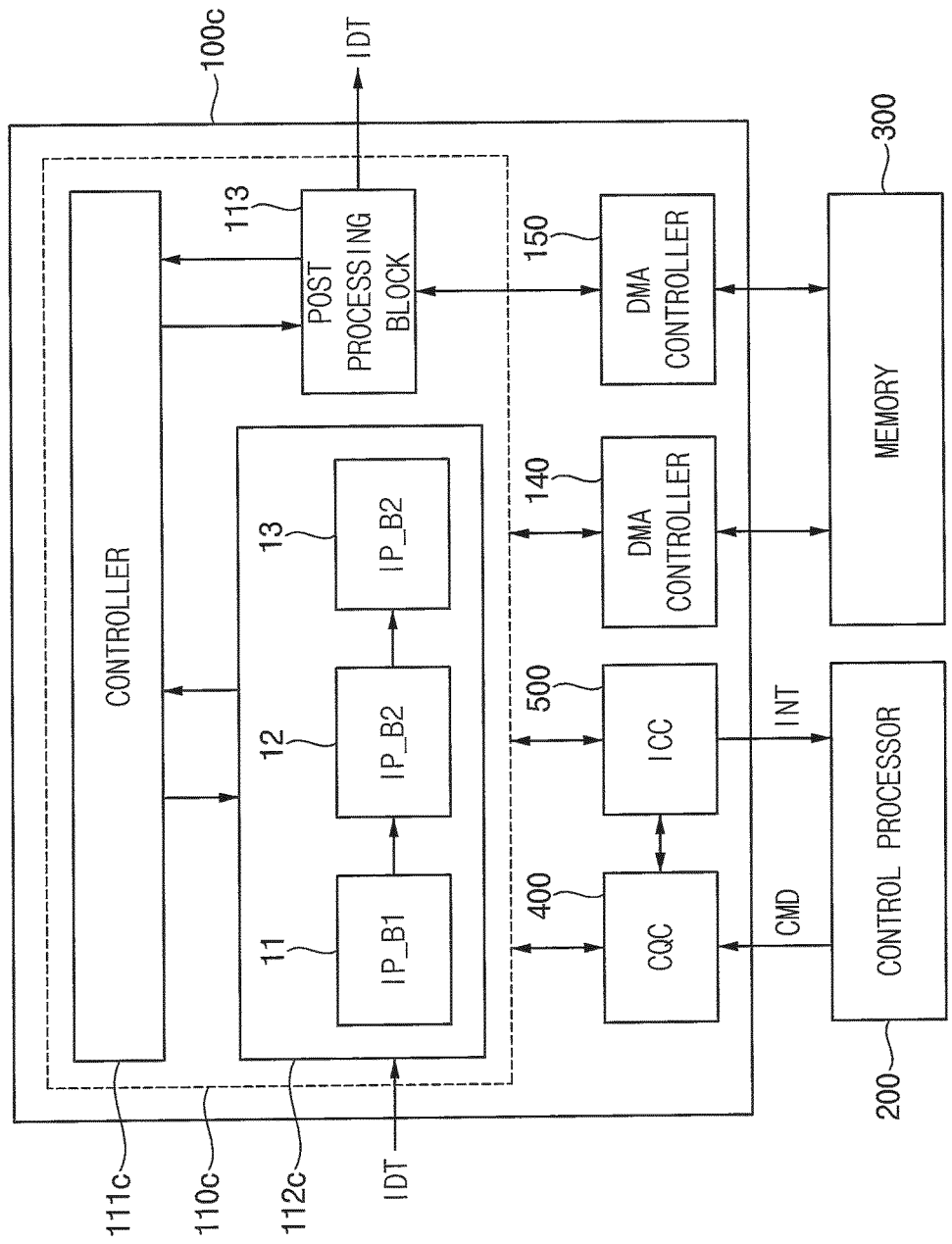
FIG. 16 is a block diagram illustrating an image signal processor according to example embodiments.

FIG. 16 is a block diagram illustrating an image signal processor according to example embodiments.

The image signal processor 100c of FIG. 16 may include an ISP engine 110c, an FRO circuit 120, a first DMA controller 140, and/or a second DMA controller 150. The ISP engine 110c may include a controller 111c, a plurality of IP blocks 112c, and/or a post-processing block 113c.

A configuration and an operation of the image signal processor 100c of FIG. 16 are similar to those of the image signal processor 100 of FIG. 2. Therefore, a difference will be mainly described.

Referring to FIG. 16, a post-processing block 113c included in an ISP engine 110c may perform post-processing on converted image data generated by each of a plurality of IP blocks 112c. For example, the post-processing block 113c may include a scaler, a joint photographic coding experts group (JPEG) circuit, etc.

Each of the plurality of IP blocks 112c may directly transmit the converted image data to the post-processing block 113c, or may store the converted image data in a memory device 300 through a first DMA controller 140.

The post-processing block 113c may receive the converted image data from each of the plurality of IP blocks 112c, or may receive, through a second DMA controller 150, the converted image data stored in the memory device 300. The post-processing block 113c may store post-processed image data IDT' in the memory device 300 through the second DMA controller 150, or may output the post-processed image data IDT' to other elements (for example, a display) included in an image processing device (1000 of FIG. 1).

Figure 17:
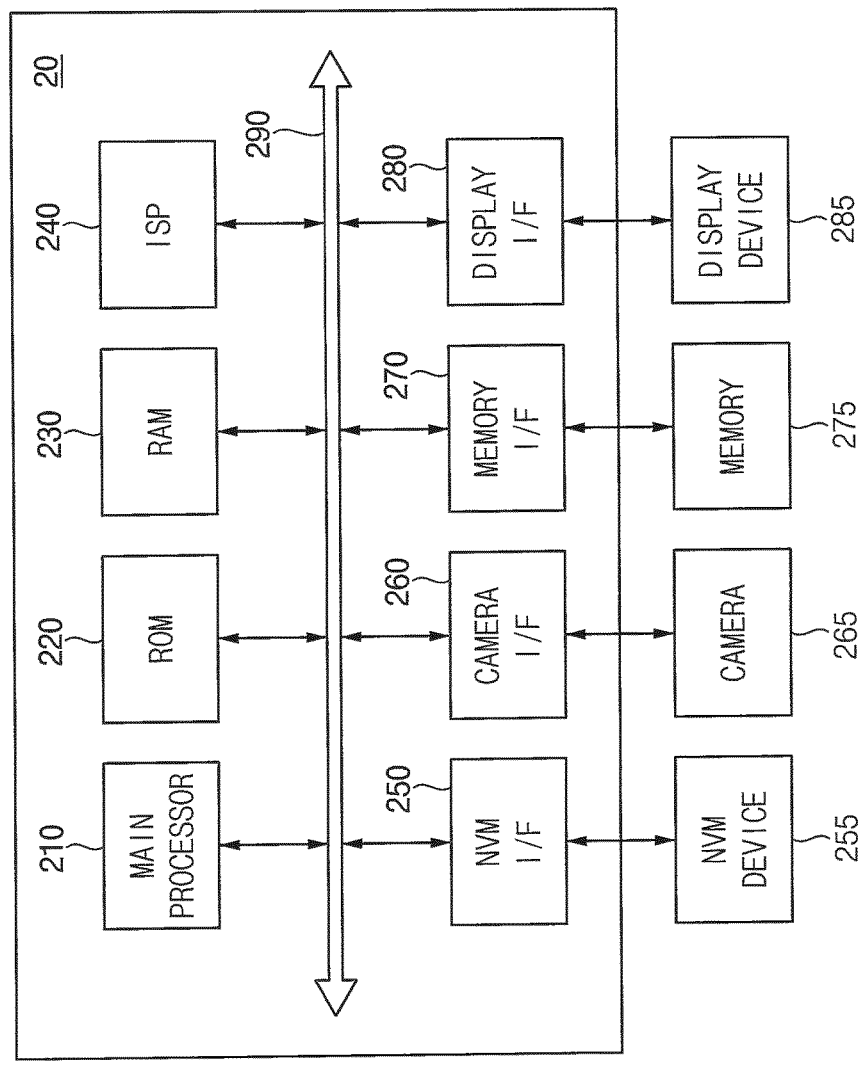
FIGS. 17 and 18 are block diagrams illustrating an image processing system according to example embodiments.
Figure 18:
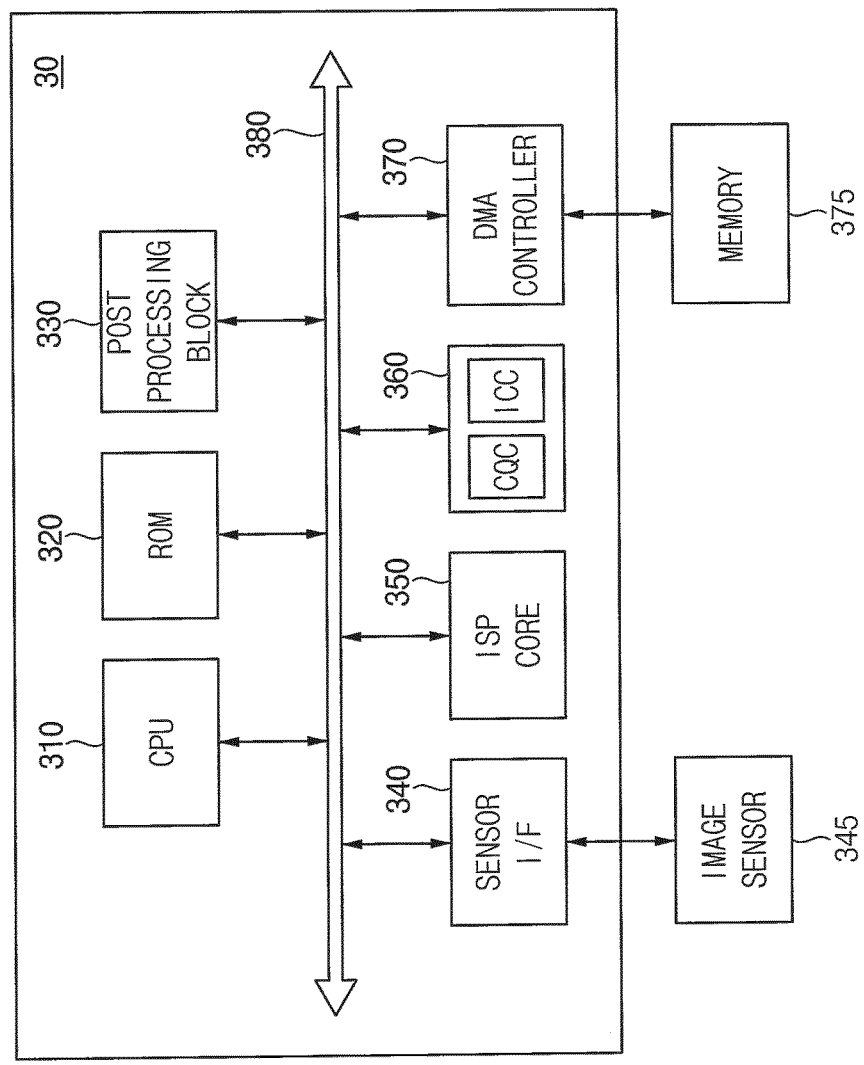

FIGS. 17 and 18 are block diagrams illustrating an image processing system according to example embodiments.

Referring to FIG. 17, the image processing system 20 may include a main processor 210, a ROM 220, a RAM 230, an image signal processor (ISP) 240, a non-volatile memory interface 250, a camera interface 260, a memory interface 270, and/or a display interface 280. The elements (e.g., the main processor 210, the ROM 220, the RAM 230, the image signal processor 240, the non-volatile memory interface 250, the camera interface 260, the memory interface 270, and the display interface 280) of the image processing system 20 may transmit or receive data through a system bus 290. In some example embodiments, the image processing system 20 may be implemented as a system-on chip (SoC). In some example embodiments, the image processing system 20 may be an application processor.

The main processor 210 may control an overall operation of the image processing system 20. The main processor 210 may be implemented with, for example, a CPU, a microprocessor, an ARM processor, an X86 processor, or an MIPS processor. According to some example embodiments, the main processor 210 may be implemented with one computing component (e.g., a multi-core processor) including two or more independent processors (or cores). The main processor 210 may process or execute data and an instruction code (or programs) each stored in the ROM 220 or the RAM 230.

The ROM 220 may store programs and/or data which are/is used continuously. The ROM 220 may be implemented as EPROM or EEPROM.

The RAM 230 may temporarily store programs, data, and/or instructions. According to some example embodiments, the RAM 230 may be implemented as DRAM or SRAM. The RAM 230 may temporarily store image data which is input/output through the interfaces 250 to 280 or is generated through image processing by the image signal processor 240.

The non-volatile memory interface 250 may interface data input from a non-volatile memory device 255 or data output to a non-volatile memory device 255. The non-volatile memory device 255 may be implemented with, for example, a memory card (for example, multi-media card (MMC), embedded multi-media card (eMMC), secure digital (SD) card, or micro SD card).

The camera interface 260 may interface image data (for example, raw image data) input from a camera 265 disposed outside the image processing system 20. The camera 265 may generate data corresponding to an image captured by using a plurality of light sensing devices. Image data received through the camera interface 260 may be provided to the image signal processor 240 or may be stored in a memory 275 through the memory interface 270.

The memory interface 270 may interface data input from the memory 275 or data output to the memory 275. According to some example embodiments, the memory 275 may be implemented as a volatile memory such as DRAM or SRAM or a non-volatile memory such as ReRAM, PRAM, or NAND flash.

The display interface 280 may interface data (for example, image data) output to a display device 285. The display device 285 may output an image signal based on image data through a display such as a liquid crystal display (LCD) or an active matrix organic light emitting diode (AMOLED).

The image signal processor 240 may perform image processing on the image data provided from the camera 265 to generate converted image data and may store the converted image data in the memory 275 or may scale the converted image data to provide a scaled image to the display device 285.

The control processor and the image signal processor as described with reference to FIGS. 1 through 16 may applied to the main processor 210 and the image signal processor 240 of FIG. 17, respectively. In a higher speed operation mode, the main processor 210 may transfer a plurality of commands to the image signal processor 240, and the image signal processor 240 may generate an interrupt signal based on the interrupt control value and the image unit identifier included in each command. Accordingly, even in the higher speed operation mode, the image signal processor 240 may normally perform image processing and control interrupts more efficiently.

Referring to FIG. 18, the image processing system 30 may include a CPU 310, a ROM 320, a post-processing block 330, a sensor interface 340, an ISP core 350, a circuit 360 including a command queue circuit CQC and an interrupt control circuit ICC as described above, and/or a DMA controller 370. The CPU 310, the ROM 320, the post-processing block 330, the sensor interface 340, the ISP core 350, the FRO circuit 360, and/or the DMA controller 370 may transmit or receive data through a system bus 380.

The CPU 310 may control an overall operation of the image processing system 30 and may process or execute programs stored in the ROM 320 to control an image processing operation.

The ROM 320 may store data and/or an instruction code (e.g., programs) including an image processing algorithm.

The post-processing block 330 may perform post-processing (for example, adjusting a size of data, or compressing data) on converted image data generated by the ISP core 350. Post-processed image data may be stored in a memory 375 through the DMA controller 370.

In some example embodiments, the image processing system 30 may further include a display interface, and the post-processed image data may be provided to a display device through the display interface. Alternatively, the image data stored in the memory 375 may be read through the DMA controller 370 and may be provided to the display device through the display interface.

The sensor interface 340 may communicate with an image sensor 345 and may receive image data (for example, raw image data) from the image sensor 345.

Figure 19:
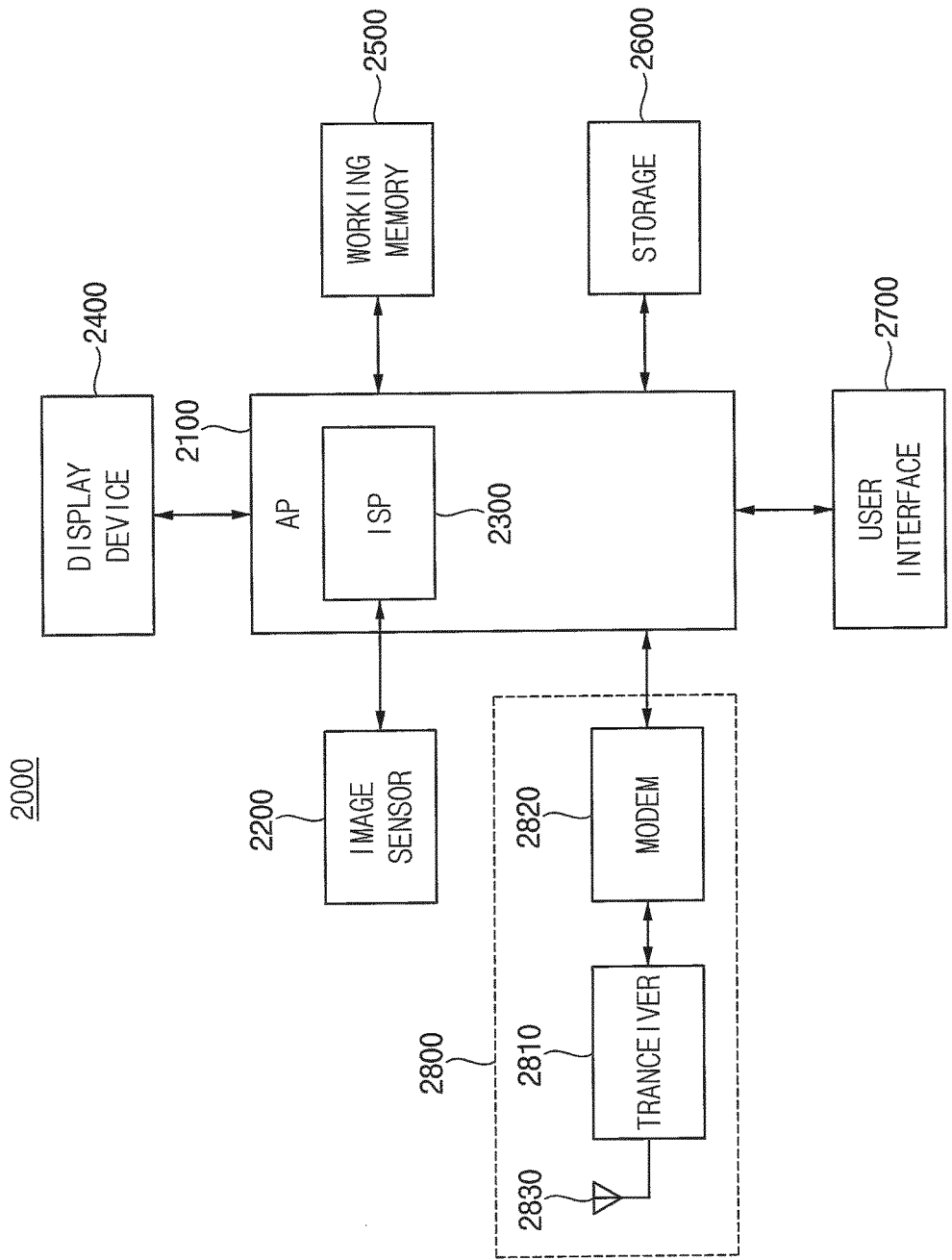
FIG. 19 is a block diagram illustrating a system according to example embodiments.

FIG. 19 is a block diagram illustrating a system according to example embodiments.

Referring to FIG. 19, the image processing device 2000 according to some example embodiments may include an application processor (AP) 2100, an image sensor 2200, a display device 2400, a working memory 2500, a storage 2600, a user interface 2700, and/or a wireless transceiver 2800, and the application processor 2100 may include an image signal processor (ISP) 2300. The image signal processor 100 of FIG. 1 may be applied as the image signal processor 2300. In some example embodiments, the image signal processor 100 may be implemented as a separate integrated circuit independently from the application processor 2100.

The application processor 2100 may control an overall operation of the image processing device 2000 and may be provided as an SoC which drives an application program and an operating system (OS).

The application processor 2100 may control an operation of the image signal processor 2300 and may provide or store converted image data, generated by the image signal processor 2300, to the display device 2400 or in the storage 2600.

The image sensor 2200 may generate image data (for example, raw image data) based on a received light signal and may provide the image data to the image signal processor 2300.

The image signal processor 100 as described above with reference to FIGS. 1 through 16 may be applied to the image signal processor 2300. The image signal processor 2300 may receive a plurality of commands from a processor in the AP2100, and perform the image processing of a plurality of image units corresponding to the plurality of commands, and perform the interrupt control as described above.

The working memory 2500 may be implemented as a volatile memory such as DRAM or SRAM or a non-volatile resistive memory such as FeRAM, RRAM, or PRAM. The working memory 2500 may store programs and/or data each processed or executed by the application processor 2100.

The storage 2600 may be implemented as a non-volatile memory device such as NAND flash or a resistive memory, and for example, may be provided as a memory card (for example, MMC, eMMC, SD, or micro SD). The storage 2600 may store data and/or a program which correspond(s) to an execution algorithm for controlling an image processing operation of the image signal processor 2300, and when the image processing operation is performed, the data and/or the program may be loaded into the working memory 2500. In some example embodiments, the storage 2600 may store image data (for example, converted image data or post-processed image data) generated by the image signal processor 2300.

The user interface 2700 may be implemented with various devices, such as a keyboard, a curtain key panel, a touch panel, a fingerprinted sensor, and a microphone, for receiving a user input. The user interface 2700 may receive the user input and may provide the application processor 2100 with a signal corresponding to the received user input.

The wireless transceiver 2800 may include a transceiver 2810, a modem 2820, and an antenna 2830.

As described above, the image signal processor and the image processing system according to example embodiments may more efficiently perform communication between the image signal processor and the control processor and/or enhance performance of the image signal processor and the image processing system by storing, in advance, the plurality of commands corresponding the plurality of image units in the command queue circuit and performing image processing based on the stored commands.

The performance may be further enhanced by determining conditions for generating the interrupt signal for each image unit based on the interrupt control value included in the command. Further the restoration procedure for errors may be more efficiently performed by determining the log interrupt event signal to be monitored based on the interrupt control value and storing the interrupt log information including the image unit identifier.

The example embodiments may be applied to any electronic devices and systems. For example, the inventive concepts may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The foregoing is illustrative of example embodiments and is not to be construed as limiting thereof. Although a few example embodiments have been described, those skilled in the art will readily appreciate that many modifications are possible in the example embodiments without materially departing from the present inventive concepts.

What is claimed is:

1. An image signal processor comprising:
   a command queue circuit configured to store a plurality of commands and sequentially provide the plurality of commands one by one, each command of the plurality of commands including an interrupt control value corresponding to each image unit of a plurality of image units, the plurality of commands being received from a control processor;
   an image processing engine configured to receive the plurality of image units and sequentially process the plurality of image units based on the plurality of commands sequentially provided from the command queue circuit; and
   an interrupt control circuit configured to receive the interrupt control value from the command queue circuit, determine one or more output interrupt event signals among a plurality of interrupt event signals based on the interrupt control value and generate an interrupt signal based on the output interrupt event signals.

2. The image signal processor of claim 1, wherein the interrupt control circuit is configured to determine the output interrupt event signals with respect to each image unit based the interrupt control value included in each command.

3. The image signal processor of claim 1, wherein the interrupt control circuit is configured to activate the interrupt signal when at least one of the output interrupt event signals is activated, regardless of activations of other interrupt event signals among the plurality of interrupt event signals except the output interrupt event signals.

4. The image signal processor of claim 1, wherein the interrupt control circuit is configured to:
   receive an interrupt enable value from the control processor;
   determine one or more enable interrupt event signals among the output interrupt event signals based on the interrupt enable value; and
   generate the interrupt signal based on the enable interrupt event signals.

5. The image signal processor of claim 4, wherein the interrupt control circuit is configured to activate the interrupt signal when at least one of the enable interrupt event signals is activated, regardless of activations of other interrupt event signals among the plurality of interrupt event signals except the enable interrupt event signals.

6. The image signal processor of claim 1, wherein the interrupt control circuit is configured;
   determine one or more log interrupt event signals among the plurality of interrupt event signals based on the interrupt control value; and
   store interrupt log information on activations of the log interrupt event signals.

7. The image signal processor of claim 6, wherein the interrupt control circuit is configured to accumulate activations of the log interrupt event signals while each image unit is processes to store unit interrupt information corresponding to each image unit.

8. The image signal processor of claim 7, wherein the interrupt control circuit is configured to sequentially store the unit interrupt information with respect to the plurality of image units.

9. The image signal processor of claim 7, wherein the interrupt control circuit is configured to determine whether to store the unit interrupt information corresponding to each image unit based on activation of a portion of the log interrupt event signals.

10. The image signal processor of claim 7, wherein each command further includes an image unit identifier indicating each image unit, and
    wherein the interrupt control circuit is configured to:
    receive the image unit identifier from the command queue circuit; and
    store the unit interrupt information including the unit image identifier.

11. The image signal processor of claim 1, wherein the interrupt control circuit includes:
    a decision bit generator configured to generate a plurality of output decision bits indicating the output interrupt event signals based on the interrupt control value;
    an output interrupt accumulation circuit configured to generate a plurality of output state bits indicating activations of the output interrupt event signals based on the plurality of interrupt event signals and the plurality of output decision bits; and
    an interrupt generator configured to generate the interrupt signal based on the plurality of output state bits.

12. The image signal processor of claim 11, wherein the output interrupt accumulation circuit includes:
    an output decision register circuit configured to store the plurality of output decision bits provided from the decision bit generator;
    an output comparison circuit configured to generate each of the plurality of output state bits by comparing each of the plurality of output decision bits and each of the plurality of interrupt event signals; and
    an output state register circuit configured to store the plurality of output state bits.

13. The image signal processor of claim 11, wherein the decision bit generator is configured to further generate a plurality of log decision bits indicating one or more log interrupt event signals among the plurality of interrupt event signals based on the interrupt control value, and
wherein the interrupt control circuit further includes:
a log interrupt accumulation circuit configured to generate a plurality of log state bits indicating activations of the log interrupt event signals based on the plurality of interrupt event signals and the plurality of log decision bits; and
a log storage configured to store interrupt log information including the plurality of log state bits.

14. The image signal processor of claim 13, wherein the decision bit generator is configured to generate the plurality of output decision bits and the plurality of log decision bits with respect to each image unit based on the interrupt control value.

15. The image signal processor of claim 13, wherein each command further includes an image unit identifier indicating each image unit, and
wherein the log storage is configured to:
receive the image unit identifier from the command queue circuit; and
store unit interrupt information including the unit image identifier with respect to each image unit.

16. The image signal processor of claim 13, wherein the log interrupt accumulation circuit includes:
a log decision register circuit configured to store the plurality of log decision bits provided from the decision bit generator;
a log comparison circuit configured to generate each of a plurality of log state bits by comparing each of the plurality of log decision bits and each of the plurality of interrupt event signals; and
a log state register circuit configured to store the plurality of log state bits.

17. The image signal processor of claim 11, wherein the interrupt generator includes:
an enable register circuit configured to store a plurality interrupt enable bits provided form the control processor; and
an enable comparison circuit configured to generate the interrupt signal by comparing each of the plurality output state bits and each of the plurality of interrupt enable bits.

18. An image processing system comprising:
a control processor configured to generate a plurality of commands and execute an interrupt service routine based on an interrupt signal, each command of the plurality of commands including an interrupt control value corresponding to each image unit of a plurality of image units; and
an image signal processor configured to process the plurality of image units and generate the interrupt signal, the image signal processor including:
a command queue circuit configured to store the plurality of commands and sequentially provide the plurality of commands one by one, each command including an interrupt control value corresponding to each image unit;
an image processing engine configured to receive the plurality of image units and sequentially process the plurality of image units based on the plurality of commands sequentially provided from the command queue circuit; and
an interrupt control circuit configured to receive the interrupt control value from the command queue circuit, determine one or more output interrupt event signals among a plurality of interrupt event signals based on the interrupt control value and generate an interrupt signal based on the output interrupt event signals.

19. An image signal processor comprising:
a command queue circuit configured to store a plurality of commands and sequentially provide the plurality of commands one by one, each command of the plurality of commands including an interrupt control value and an image unit identifier corresponding to each image unit of a plurality of image units, the plurality of commands being received from a control processor;
an image processing engine configured to receive the plurality of image units and sequentially process the plurality of image units based on the plurality of commands sequentially provided from the command queue circuit; and
an interrupt control circuit configured to receive the interrupt control value and the image unit identifier from the command queue circuit, determine one or more output interrupt event signals and one or more log interrupt event signals among a plurality of interrupt event signals based on the interrupt control value, generate an interrupt signal based on the output interrupt event signals, store interrupt log information including the image unit identifier and activations of the log interrupt event signals based on the log interrupt event signals.

20. The image signal processor of claim 19, wherein the interrupt control circuit includes:
a decision bit generator configured to generate a plurality of output decision bits indicating the output interrupt event signals and a plurality of log decision bits indicating the log interrupt event signals based on the interrupt control value;
an output interrupt accumulation circuit configured to generate a plurality of output state bits indicating activations of the output interrupt event signals based on the plurality of interrupt event signals and the plurality of output decision bits;
a log interrupt accumulation circuit configured to generate a plurality of log state bits indicating activations of the log interrupt event signals based on the plurality of interrupt event signals and the plurality of log decision bits;
an interrupt generator configured to generate the interrupt signal based on the plurality of output state bits; and
a log storage configured to store the interrupt log information.

* * * * *